(12) United States Patent
Mukherjee et al.

(10) Patent No.: US 12,341,905 B2
(45) Date of Patent: *Jun. 24, 2025

(54) METHOD AND SYSTEM FOR PROVIDING DATA SECURITY FOR MICRO-SERVICES ACROSS DOMAINS

(71) Applicant: BlackBerry Limited, Waterloo (CA)

(72) Inventors: Biswaroop Mukherjee, Stittsville (CA); Geordon Thomas Ferguson, Mississauga (CA); Roger Paul Bowman, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,044

(22) Filed: Oct. 11, 2023

(65) Prior Publication Data
US 2024/0056311 A1   Feb. 15, 2024

Related U.S. Application Data

(63) Continuation of application No. 17/384,103, filed on Jul. 23, 2021, now Pat. No. 11,968,310.

(51) Int. Cl.
H04L 9/32      (2006.01)
H04L 9/08      (2006.01)
(Continued)

(52) U.S. Cl.
CPC .......... *H04L 9/3247* (2013.01); *H04L 9/0825* (2013.01); *H04L 9/3213* (2013.01);
(Continued)

(58) Field of Classification Search
CPC ..... H04L 9/3213; H04L 9/0825; H04L 67/63; H04L 63/0807; H04L 67/10;
(Continued)

(56) References Cited

U.S. PATENT DOCUMENTS 8,423,651 B1   4/2013 Grieve et al.
8,452,881 B2   5/2013 Boubez et al.
(Continued)

FOREIGN PATENT DOCUMENTS

KR   102172287 B1   10/2020
WO   2014/169381 A1   10/2014
WO   2020168207 A1   8/2020

OTHER PUBLICATIONS

International Search Report, PCT/CA2022/051103, dated Oct. 21, 2022, pp. 1-3.
(Continued)

*Primary Examiner* — Mohammad A Siddiqi
(74) *Attorney, Agent, or Firm* — Moffat & Co

(57) ABSTRACT

A method at a network element for securely sharing services across domains, the method including receiving a request at the network element to add a first domain and an edge domain to a system; provisioning a public key of the network element to the first domain and the edge domain; receiving a public key of the first domain; populating, in the network element, a table with services provided by the first domain or the edge domain; populating, in the network element, a second table with applications installed at the first domain or edge domain and permissions for services for the applications; and controlling access to the services by the applications.

18 Claims, 14 Drawing Sheets

(51) Int. Cl.
*H04L 9/40* (2022.01)
*H04L 67/10* (2022.01)
*H04L 67/12* (2022.01)
*H04L 67/63* (2022.01)
*H04W 4/44* (2018.01)

(52) U.S. Cl.
CPC .......... *H04L 63/0823* (2013.01); *H04L 67/10* (2013.01); *H04L 67/12* (2013.01); *H04L 67/63* (2022.05); *H04W 4/44* (2018.02)

(58) Field of Classification Search
CPC ... H04L 63/0823; H04L 9/3247; H04L 67/12; H04L 2209/84; H04L 63/126; H04W 4/44
See application file for complete search history.

(56) References Cited

U.S. PATENT DOCUMENTS

| | | | |
|---|---|---|---|
| 9,191,391 | B1 | 11/2015 | Stillerman |
| 9,445,270 | B1 | 9/2016 | Bicket |
| 9,819,673 | B1 | 11/2017 | Johansson |
| 9,959,415 | B1 | 5/2018 | Rodriguez et al. |
| 9,973,625 | B1 | 5/2018 | Voorhees |
| 10,382,203 | B1* | 8/2019 | Loladia .................... H04L 63/06 |
| 11,108,779 | B2 | 8/2021 | Meriac |
| 11,231,862 | B1* | 1/2022 | Vig ........................ G06F 3/0665 |
| 11,601,348 | B2 | 3/2023 | Gupta |
| 11,968,310 | B2* | 4/2024 | Mukherjee .......... H04L 63/0823 |
| 12,013,957 | B2* | 6/2024 | Mukherjee .............. H04L 63/10 |
| 2013/0016605 | A1* | 1/2013 | Chen ........................ H04L 45/28 370/221 |
| 2014/0067758 | A1 | 3/2014 | Boldyrev et al. |
| 2015/0143467 | A1 | 5/2015 | Hebert et al. |
| 2015/0326529 | A1* | 11/2015 | Morita ................ G06F 21/6218 726/12 |
| 2016/0127514 | A1* | 5/2016 | Maksumov ............. H04W 4/60 709/202 |
| 2016/0165651 | A1* | 6/2016 | Pathuri .................... H04W 8/26 370/329 |
| 2016/0277191 | A1 | 9/2016 | Lee |
| 2016/0277927 | A1* | 9/2016 | Lee .......................... H04L 67/51 |
| 2017/0093866 | A1* | 3/2017 | Ben-Noon .......... H04W 12/068 |
| 2017/0195331 | A1 | 7/2017 | Wu et al. |
| 2019/0132362 | A1 | 5/2019 | Hutchinson et al. |
| 2019/0166635 | A1* | 5/2019 | McColgan ............ H04W 12/50 |
| 2019/0386957 | A1 | 12/2019 | Leon |
| 2021/0082210 | A1 | 3/2021 | Sakr |
| 2021/0092018 | A1 | 3/2021 | Fang et al. |
| 2021/0144517 | A1 | 5/2021 | Guim Bernat et al. |
| 2021/0209494 | A1 | 7/2021 | Mukherjee et al. |
| 2021/0302941 | A1 | 9/2021 | Francis et al. |
| 2021/0350021 | A1 | 11/2021 | Wang et al. |
| 2022/0006800 | A1 | 1/2022 | Duchastel |
| 2022/0043924 | A1 | 2/2022 | Hu et al. |
| 2024/0223363 | A1* | 7/2024 | Mukherjee ............ H04L 9/0825 |

OTHER PUBLICATIONS

Written Opinion of the International Searching Authority, PCT/CA2022/051103, dated Oct. 21, 2022, pp. 1-5.
United States Patent and Trademark Office (USPTO) Office Action for U.S. Appl. No. 17/384,165 dated Oct. 21, 2022, 28 pages.
United States Patent and Trademark Office (USPTO) Office Action for U.S. Appl. No. 17/384,165 dated Feb. 3, 2023, 10 pages.
United States Patent and Trademark Office (USPTO) Notice of Allowance and Fee(s) Due for U.S. Appl. No. 17/384,165 dated Oct. 25, 2023, 8 pages.
Canadian Intellectual Property Office (CIPO) Patent Cooperation Treaty (PCT) International Search Report and Written Opinion of the International Searching Authority for International Application No. PCT/CA2022/051104 dated Oct. 18, 2022, 8 pages.
United States Patent and Trademark Office (USPTO) Office Action for U.S. Appl. No. 17/384,140 dated Apr. 20, 2023, 29 pages.
United States Patent and Trademark Office (USPTO) Office Action for U.S. Appl. No. 17/384,140 dated Oct. 13, 2023, 24 pages.
Canadian Intellectual Property Office (CIPO) Patent Cooperation Treaty (PCT) International Search Report and Written Opinion of the International Searching Authority for International Application No. PCT/CA2022/051105 dated Sep. 29, 2022, 10 pages.
Bandur et al., "A Domain-Centralized Automotive Powertrain E/E Architecture", Conference Paper Apr. 2021, 11 pages.
Esen et al., "Control as a Service (CaaS)", SWEC'15: Proceedings of the Second International Workshop on the Swarm at the Edge of the Cloud, Apr. 2015, pp. 13-18 (6 pages).
United States Patent and Trademark Office (USPTO) Office Action for U.S. Appl. No. 17/384,165 dated Mar. 20, 2023, 5 pages.
United States Patent and Trademark Office (USPTO) Office Action for U.S. Appl. No. 17/384,165 dated Jul. 17, 2023, 26 pages.
European Patent Office (EPO): Extended European Search Report (EESR) for Application No. 22844766.0, dated: Apr. 11, 2025, 7 pages.
European Patent Office (EPO): Extended European Search Report (EESR) for Application No. 22844767.8, dated: Apr. 29, 2025, 10 pages.
Laput et al., "Synthetic Sensors: Towards General-Purpose Sensing", CHI '17: Proceedings of the 2017 CHI Conference on Human Factors in Computing Systems, date: May 2, 2017, pp. 3986-3999, XP058337840.

* cited by examiner

METHOD AND SYSTEM FOR PROVIDING DATA SECURITY FOR MICRO-SERVICES ACROSS DOMAINS

FIELD OF THE DISCLOSURE

The present disclosure relates to distributed systems, and in particular relates to data security in a distributed system.

BACKGROUND

Modern vehicles have many sensors. However, such sensors may be distributed within the various computing nodes on the vehicle, where each computing node may have access to zero, one or more sensor drivers. Such sensor nodes may further have different manufacturers, and operate using different operating systems. Similarly, other distributed systems could have a plurality of nodes where the nodes need to communicate with each other.

Sensors, or groups of sensors, may be used to generate information that could be useful to one or more applications. Such information is referred to herein as an insight. In some cases, insights are generated based on proprietary algorithms, machine learning code, or similar processing, and may be valuable. Such insights may need to be shared with authorized software modules running in external domains, where the security in such external domains may vary.

BRIEF DESCRIPTION OF THE DRAWINGS

The present disclosure will be better understood with reference to the drawings, in which.

DETAILED DESCRIPTION OF THE DRAWINGS

Figure 1:
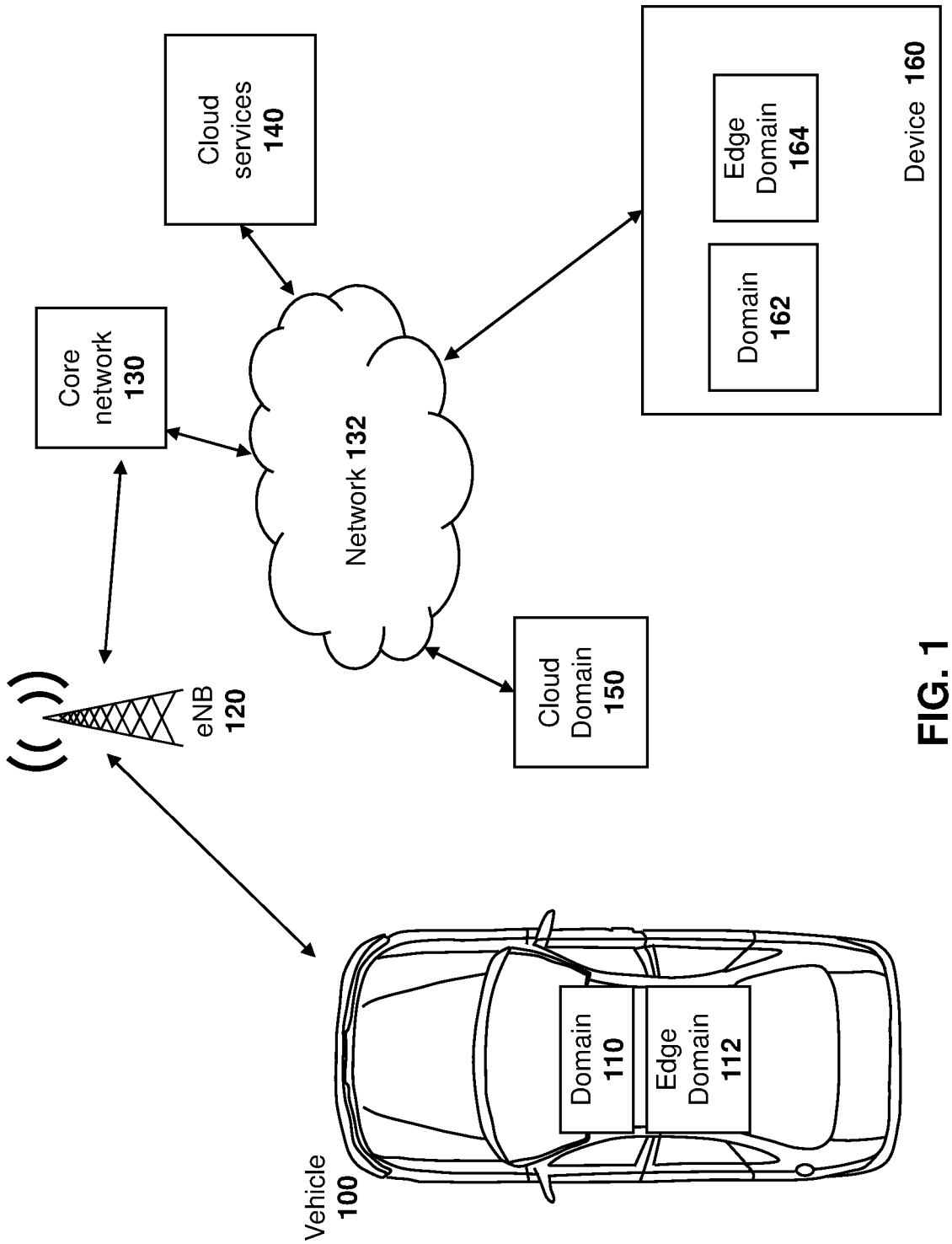
FIG. 1 is a block diagram showing an example system having insight generators and insight consumers.

The present disclosure provided a method at a first domain for obtaining at least one insight from a second domain, the method comprising: registering an application with an anchor in the first domain; providing, from the anchor to the application, a first message signed by the anchor; sending, from the first domain to a network domain, the signed message; receiving, from the network domain, at least one signed token, each of the at least one signed token being for a synthetic sensor on the second domain, where the synthetic sensor provides an insight; sending a request message to the second domain, the request message requesting the insight and including the at least one token; and receiving the insight from a synthetic sensor associated with the at least one token.

The present disclosure further provides a computing device having a first domain configured for obtaining at least one insight from a second domain, the computing device comprising: a processor; and a communications subsystem, wherein the computing device is configured to: register an application with an anchor in the first domain; provide, from the anchor to the application, a first message signed by the anchor; send, from the first domain to a network domain, the signed message; receive, from the network domain, at least one signed token, each of the at least one signed token being for a synthetic sensor on the second domain, where the synthetic sensor provides an insight; send a request message to the second domain, the request message requesting the insight and including the at least one token; and receive the insight from a synthetic sensor associated with the at least one token.

The present disclosure further provides a computer-readable medium for storing instruction code, which, when executed by a processor on a computing device having a first domain configured for obtaining at least one insight from a second domain, cause the computing device to: register an application with an anchor in the first domain; provide, from the anchor to the application, a first message signed by the anchor; send, from the first domain to a network domain, the signed message; receive, from the network domain, at least one signed token, each of the at least one signed token being for a synthetic sensor on the second domain, where the synthetic sensor provides an insight; send a request message to the second domain, the request message requesting the insight and including the at least one token; and receive the insight from a synthetic sensor associated with the at least one token.

The present disclosure further provides a method at a first domain for obtaining at least one insight from a second domain, the method comprising: synchronizing a permissions table at the first domain with a master permissions table at a network element; receiving a request for an insight from an application at a bridge in the first domain; confirming an identity of the application; verifying, at the bridge, application permissions using the permissions table at the first domain, the verifying confirming that the application has permission to access the insight; sending a request message from the first domain to the second domain, the request message being signed by a private key of the first domain and requesting the insight; and receiving the insight from the second domain.

The present disclosure further provides a computing device having a first domain for obtaining at least one insight from a second domain, the computing device comprising: a processor; and a communications subsystem, wherein the computing device is configured to: synchronize a permissions table at the first domain with a master permissions table at a network element; receive a request for an insight from an application at a bridge in the first domain; confirm an identity of the application; verify, at the bridge, application permissions using the permissions table at the first domain, the verifying confirming that the application has permission to access the insight; send a request message from the first domain to the second domain, the request message being signed by a private key of the first domain and requesting the insight; and receive the insight from the second domain.

The present disclosure further provides a computer readable medium for storing instruction code, which, when executed by a processor of computing device having a first domain for obtaining at least one insight from a second domain cause the computing device to: synchronize a permissions table at the first domain with a master permissions table at a network element; receive a request for an insight from an application at a bridge in the first domain; confirm an identity of the application; verify, at the bridge, application permissions using the permissions table at the first domain, the verifying confirming that the application has permission to access the insight; send a request message from the first domain to the second domain, the request message being signed by a private key of the first domain and requesting the insight; and receive the insight from the second domain.

The present disclosure further provides a method at a network element for securely sharing services across domains, the method comprising: receiving a request at the network element to add a first domain and an edge domain to a system; provisioning a public key of the network element to the first domain and the edge domain; receiving a public key of the first domain; populating, in the network element, a table with services provided by the first domain or the edge domain; populating, in the network element, a second table with applications installed at the first domain or edge domain and permissions for services for the applications; and controlling access to the services by the applications.

The present disclosure further provides a network element for securely sharing services across domains, the network element comprising: a processor; and a communications subsystem wherein the network element is configured to: receive a request at the network element to add a first domain and an edge domain to a system; provision a public key of the network element to the first domain and the edge domain; receive a public key of the first domain; populate, in the network element, a table with services provided by the first domain or the edge domain; populate, in the network element, a second table with applications installed at the first domain or edge domain and permissions for services for the applications; and control access to the services by the applications.

The present disclosure further provides a computer readable medium for storing instruction code, which, when executed by a processor of a network element configured for securely sharing services across domains cause the network element to: receive a request at the network element to add a first domain and an edge domain to a system; provision a public key of the network element to the first domain and the edge domain; receive a public key of the first domain; populate, in the network element, a table with services provided by the first domain or the edge domain; populate, in the network element, a second table with applications installed at the first domain or edge domain and permissions for services for the applications; and control access to the services by the applications.

In a modern vehicle, information from one or more physical sensors may be processed to create an "Insight" that may be valuable in a system. Such one or more physical sensors and the processing associated therewith may be referred to logically as a micro-service or a Synthetic Sensor (SS). The terms micro-service and synthetic sensor are used interchangeably herein.

Synthetic Sensors may exist in other types of applications, including but not limited to medical applications, manufacturing applications, Internet of Things applications, among others, and the present disclosure is not limited to vehicle applications. Vehicle applications are provided for illustration below.

Insight is the term used herein to describe any computer created interpretation of basic sensor data. Insights can be as straight forward as data aggregation or correlation or as complex as artificial intelligence and machine learning. For example, a temperature sensor providing high and low watermarks for notification may be considered an "insight". For location services, geofencing is an insight. For cameras, occupant recognition may be an insight. The use of a combination of sensors such as temperature sensors and cameras, may be used with an artificial intelligence model to determine whether a car seat is occupied in a hot vehicle, which may be an insight. Many other examples of insights are possible.

In one embodiment, the vehicle applications may be implemented in a system providing consistent access to vehicle data and intelligent insights in a way that is familiar and accessible to developer communities. Such environment may allow cloud developers to extend their reach to the edge within the vehicle through the development of Synthetic Sensors which derive intelligent insights on vehicle data using common cloud development technologies and paradigms. Such environment may provide consistent access to vehicle data such that Synthetic Sensors can be written and deployed to a broad vehicle base without bespoke customization.

Insights may be generated based on a processor running on a first installation or domain, but they often need to be shared with authorized software modules running in external domains. The first domain is able to control the installation and communication of modules within it, and therefore determine their identity and authorization. However, the first domain does not have such control in other domains.

For example, one external domain may be an In-Vehicle Infotainment (IVI) system of an automobile that may run an application that accesses insights and provides information to a driver.

The modules or applications that can use insights, whether they are in the first domain or outside the first domain, are determined by a manager or actor, referred to herein as a fleet manager. Implementation of such modules or applications and their access to insights may be controlled by the fleet manager in some embodiments. However, for some insights the fleet manager may delegate implementation decisions to a driver. For example, two insights may provide similar data regarding child seat occupancy. The fleet manager may choose or license a first insight in this case. In other cases, the fleet manager may allow a driver to choose which insight to acquire/use.

In some embodiments the fleet manager can change the set of insights available to a module or application at any time.

In some embodiments, the system further needs to account for a disconnected mode. Specifically, a vehicle may not always have access to the fleet manager, such as when no internet connection exists to the vehicle. In some embodiment a vehicle may be disconnected from the fleet manager for potentially long periods of time, such as when a vehicle is parked in a rural area with no cellular services.

Accordingly, the present disclosure provides methods and systems for distributing insights to only authorized modules in external domains.

Example Distributed System

Reference is now made to FIG. 1, which shows an example system showing various generators and consumers of insights. The embodiment of FIG. 1 is merely provided for illustration purposes, and in some cases fewer participants in a system will exist. In other cases, more participants in a system will exist.

In the embodiment of FIG. 1, a vehicle 100 may be equipped with a computing system and a communications system. Part of the computing system may include a domain 110, which, as described below, may have applications that consume insights. Further, part of the computing system on vehicle 110 may include an edge domain 112. In some embodiments, edge domain 112 may generate insights. However, in other cases, insights may be generated within domain 110 or consumed within edge domain 112.

In the example of FIG. 1, vehicle 100 communicates utilizing a communications system with a cellular base station, shown in FIG. 1 as eNB 120. The base station may communicate with a core network 130 which may then forward communications through a network 132 to a cloud services provider 140. Network 132 may, for example, be a wide area network such as the Internet.

In other embodiments, rather than a core network 130, any technology associated with a particular cellular or wireless communications protocol may be used.

As described below, cloud services 140 may provide security for insights that are generated within a domain.

In some embodiments, a cloud domain 150 may generate or consume insights. Cloud domain 150 may communicate with through network 132 with a cloud services provider 140 and may communicate with other domains such as domain 112 on vehicle 100 in some cases.

Further, rather than a vehicle, a device 160 may generator consume insights. Device 160 maybe any computing device capable of generating or consuming such insights, and could include Internet of Things devices, mobile devices, medical equipment, vehicles or equipment associated with vehicles, among other options. Device 160 make communications through network 132 realizing various wired or wireless technologies, including but not limited to Ethernet, fiber, cellular, Wi-Fi, satellite, among other options.

Device 160 may include a domain 162 which may, in some embodiments, consume insights. Further, device 160 may include an edge domain 164 which may, in some cases, generate insights. However, in other cases, domain 162 may generate insights and edge domain 164 may consume insights.

Further, while the embodiment of FIG. 1 shows only two domains within vehicle 100 or device 160, in practice only one or many domains may exist within the vehicle 100 or the device 160, and the present disclosure is not limited to only having two domains within any particular device. In particular, a device 160 may be solely used for generating insights, in which case it will have only a single domain. In other cases, device 160 may solely consume insights and again have only one domain. In other cases, a device 160 or vehicle 100 may have a plurality of domains along with edge domain 112.

The present disclosure will be described with regard to an automotive system with distributed nodes. However, this is merely provided for illustration purposes and the methods and systems described herein could equally be used with any other distributed systems.

Figure 2:
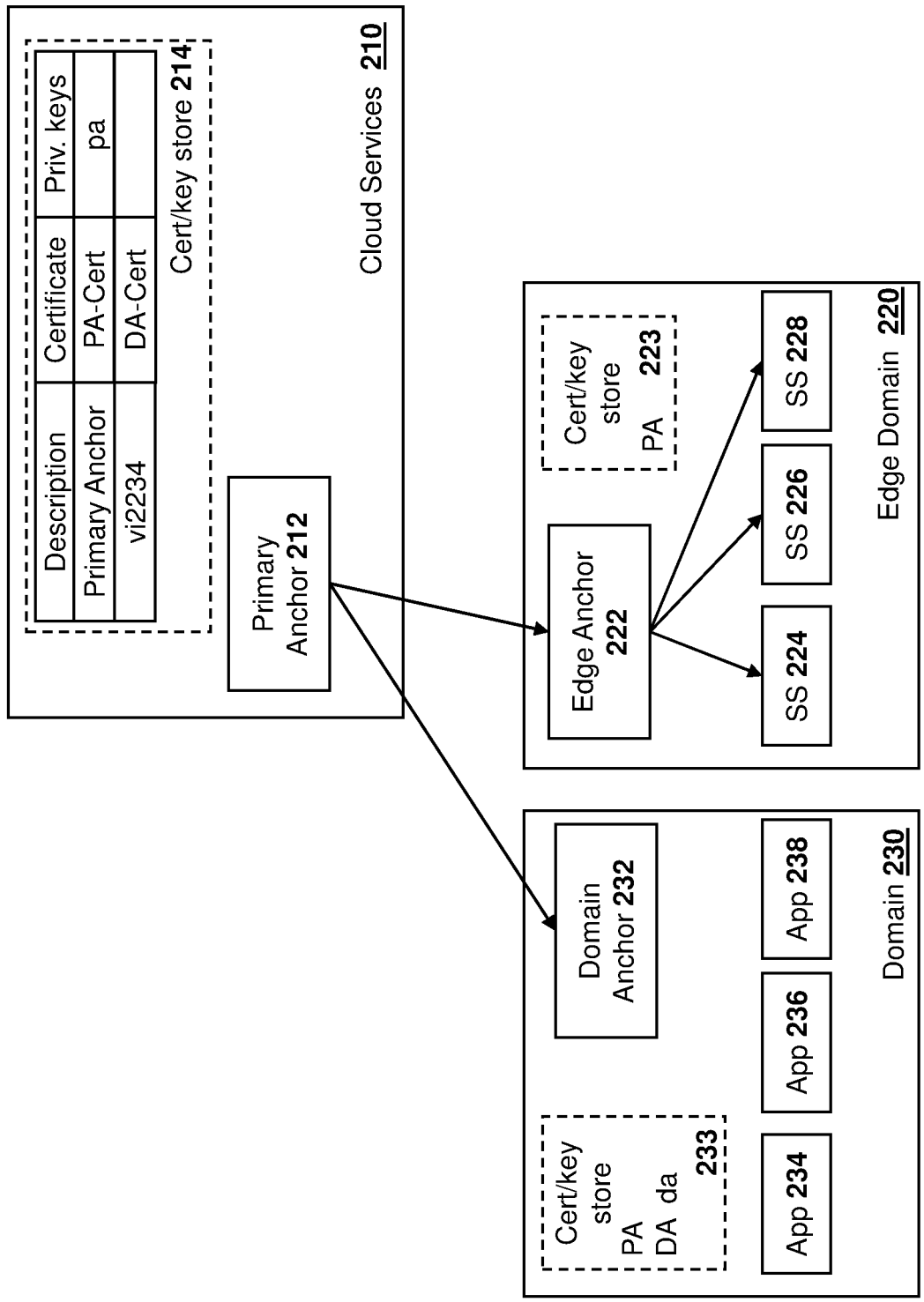
FIG. 2 is a block diagram showing an example computing system having three domains.

Reference is now made to FIG. 2 which shows one simplified distributed system.

In the example of FIG. 2, a cloud services domain 210 may be associated with a fleet manager. The cloud services domain 210 includes a primary anchor module 212. One purpose of the primary anchor module is for security for insights within the system.

Cloud services domain 210 further includes a certificate or key store 214. As described below, in the embodiments herein the system may be installed securely in the automobile and in the back-end information technology infrastructure. The installation may include provisioning of keys in a secret store in the automobile that the fleet manager is able to verify from outside of the automobile using the information technology infrastructure. The secret store prevents other software modules from accessing the secrets and may use hardware Key-Encryption-Keys (KEKs) to protect the provisioned keys. A public/private key pair may be generated in the automobile and the public key be shared via a trusted link. Alternatively, a symmetric secret key may be injected by the fleet manager by means of a trusted connection into the automobile, and a copy stored at the information technology infrastructure. In either case the means to authenticate the identity of the provisioned system in the field is achieved.

In the example of FIG. 2, the certificate or key store 214 stores a certificate for the primary anchor 212, as well as a private key for the primary anchor 212. The certificate or key store 214 may further store various domain certificates for domain anchors, as described below.

In the embodiment of FIG. 2, a first domain, referred to as edge domain 220, may be used for providing insights from synthetic sensors. The domain is referred to as an edge domain based on a cloud perspective indicating that it is on the edge of the cloud. Edge domain 220 is installed on a vehicle having a vehicle identifier. While the embodiment of FIG. 2 shows a single edge domain, in practice multiple edge domains may exist within a vehicle.

Edge domain 220 includes an edge anchor 222 which is used for security for insights, among other functionalities.

Edge domain 220 further includes a certificate or keystore 223 which may be used to store the certificate for the primary anchor 212.

In the example of FIG. 2, three synthetic sensors, namely SS 224, SS 226, and SS 228 are part of edge domain 220.

While three synthetic sensors are shown, in practice fewer or more synthetic sensors may exist within an edge domain.

Further, in the example of FIG. 2, a secondary domain 230 is shown. Domain 230 could, for example, be associated with an infotainment system in the vehicle. However, domain 230 could also be associated with other aspects of the vehicle and is not limited to an infotainment system.

Domain 230 includes a domain anchor 232 which is used, among other functionality, to provide security for insights.

Domain 230 further includes a certificate or key store 233. In this case, this certificate or key store 233 may include storage for a key for the primary anchor 212, along with storage for a certificate associated with the domain anchor 232.

In the example of FIG. 2, domain 230 includes three applications, namely application 234, application 236 and application 238. However, the number of applications associated with the domain is not limited to three, and fewer or more applications could be associated with a particular domain.

Further, while the embodiment of FIG. 2 only shows a single secondary domain, in practice multiple secondary domains may exist within a vehicle and the illustration of a single domain 230 is provided as an example only.

With regards to connectivity between the various domains of FIG. 2, edge domain 220 and domain 230 may be connected internally within a vehicle using any wired or wireless technology. For example, the connection may use a bus, short range wireless communications, or other similar communication technologies.

Communication with the cloud services 210 may be through wireless technologies such as a cellular connection, satellite connection, wide area network (WAN) such as Wi-Fi, among other options. Further, in some cases, communications may be through wired connections, such as when a vehicle is being manufactured and is being provisioned or when the vehicle is in a service centre and is connected through a secure channel.

Failure of a domain to connect to the edge domain for control messages would also mean failure to obtain insights. Typically, the domains inside an automobile are connected by an on-board network. However, these links cannot be assumed to be secure from eavesdropping. Further, not all modules or applications connected to the network can be assumed to be trusted. As such, integrity and confidentiality of messages is not assured when communicating between domains, and defense against occasional DOS may be adopted in some cases.

Further, in some cases the connectivity from the Internet to the automobile may be intermittent. As such the fleet manager and the information technology infrastructure may not always be connected to the edge domain 220. When the automobile is disconnected, only the domains connected inside the automobile can obtain insights from the edge domain 220. In accordance with some embodiments herein, the last state of authorizations synchronized between the edge domain and the fleet manager may be respected when the edge domain is disconnected from the cloud services 210.

Provisioning

Certain trust elements may be provisioned in a vehicle environment during manufacture of the vehicle, or subsequently at a trusted service center.

For example, an automobile leaving the factory may be provisioned with at least: an edge domain 220, a secondary domain 230 such as an infotainment system, and a trust anchor application (domain anchor 232) in the secondary domain 230.

In one embodiment a trusted computer, part of an information technology infrastructure that the fleet owner controls, is connected via a secured link to the factory. This is called the primary anchor 212 and identifies and associates keys and certificates with one or more vehicle identifiers as part of the provisioning process.

A module in the edge domain 220 that has access to a secured storage such as certificate or key store 223 is designated as the trust anchor (edge anchor 222) for the edge domain 220. The edge anchor 222 receives and stores at least one public key (and certificate) from the primary anchor 212 that edge anchor 222, along with various SSs within the edge domain, use to check if a message was signed using a private key of the primary anchor 212. This is shown as public key "PA" and private key "pa" in the embodiment of FIG. 2.

A domain trust anchor application (domain anchor 232) is installed in the domain 230 installation of the automobile.

Domain anchor 232 uses the certificate or key store 233 to generate an asymmetric key pair in one embodiment. For example, this is shown with a public key/private key pair DA/da in the example of FIG. 2. In other embodiments other forms of cryptography such as symmetric key pairs may be used.

In one embodiment, a private key of the domain anchor 232 remains secure in the certificate or key store 233 while a certificate request containing the public key is sent to the information technology infrastructure. The information technology infrastructure returns a certificate signed by the private key of the primary anchor 212.

In this embodiment, the domain anchor 232 and the primary anchor 212 now have the ability to mutually authenticate as well as securely share information. Such secure sharing of information may, for example, use a Hypertext Transport Protocol Secure (HTTPs) protected endpoint by the domain anchor 232 to reach the primary anchor 212 when connectivity is available.

While the above discusses provisioning during manufacture, in other embodiments the provisioning may occur subsequently. For example, service center installation and provisioning can be used with the embodiments described herein.

Furthermore, instead of the public/private keypair based provisioning described above, some Original Equipment Manufacturers (OEMs) may prefer injecting a shared (symmetric) secret key from the primary anchor 212 to the domain 230 certificate or key store 233. The subsequent provisioning steps can be adapted to work with such symmetric keys.

Permissions

Figure 3:
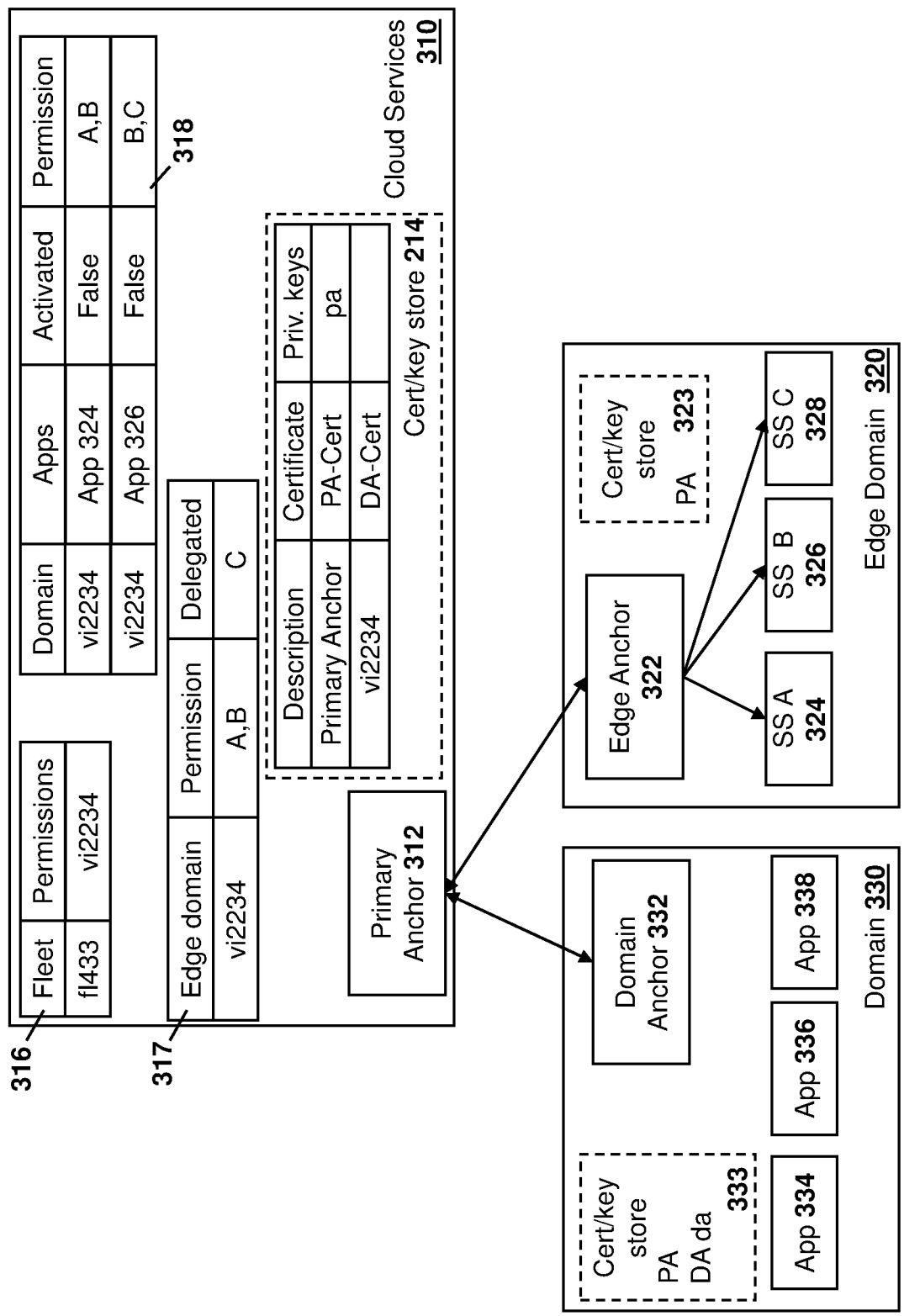
FIG. 3 is a block diagram showing an example computing system in which a cloud or network domain stores permissions for applications and microservices.

To express the security expectation of a protocol insight, one or more insights are bound to a permission. Reference is now made to FIG. 3.

In the embodiment of FIG. 3, cloud services 310 include the primary anchor 312 and a certification or key store 314. Cloud services further includes permission tables including a table associating a particular fleet identifier with particular permissions, as shown with table 316.

Further, table 317 includes an identifier for an edge domain which includes a vehicle identifier, along with the types of permissions that are provided for that edge domain and permissions that are delegated for that edge domain, as described below.

An applications table 318 associates an application on a particular domain with permissions and whether or not that application has been activated within the domain.

The permissions tables in the example of FIG. 3 are merely provided as an example and are not limiting. In some cases, more information may be provided in any of tables 316, 317 or 318. In other cases, information may be modified, or the tables make be combined in certain embodiments.

At least one edge domain 320 may be associated with a vehicle. Edge domain 320 includes edge anchor 322 and a certificate or key store 323.

In the example of FIG. 3, edge domain 320 includes three synthetic sensors, namely SS A 324, SS B 326, and SS C 328.

Further, a domain 330 is also on a vehicle. Domain 330, for example, may comprise the infotainment system on the vehicle. However, other examples of domains are possible.

Domain 330 includes a domain anchor 332 along with a certificate or key store 333.

In the example of FIG. 3, domain 330 includes application 334, application 336 and application 338. The number of applications on a domain is not however limited to three applications, and fewer or more applications could be provided on domain 330.

In the embodiments of the present disclosure, permissions are defined globally and scoped to be enforced in the edge domain by one particular SS.

A set of permissions is deployed on an automobile at any time, and this set is known and configured at the information technology infrastructure domain within cloud services 310.

An entity such as an OEM may have ultimate control of all permissions. Such entity may delegate control of a subset of permissions to other trusted entities. For example, a driver of the vehicle may be a trusted entity. The driver may alter the state of these delegated permissions using the in-car network, or using the Internet among other options.

For example, on vehicle manufacturer may determine that all insights should be provided from synthetic sensors approved only by the vehicle manufacturer. In this case, no delegation of permissions is provided. In another case, a second vehicle manufacturer may permit the source of certain types of insights to be chosen by the driver of the vehicle, and these would be referred to as the delegated permissions.

In one embodiment, when the vehicle becomes disconnected from the Internet, permissions work with the latest control entity or delegate inputs available at the point of enforcement.

Therefore, in accordance with the embodiment of FIG. 3, a controlling entity such as a fleet manager may approve the installation of the synthetic sensors and the associated permissions on a set of vehicles. The synthetic sensors, such as sensors 324, 326 or 328, that produce insights may then be installed on the edge domain 320.

Mechanisms to Share Insights

As stated above, in the embodiments of the present disclosure, modules (also referred to as applications) may be allowed to receive insights. However, applications ultimately represent the author—a human, or an organization. They further represent a point in time, indicated by their version.

Therefore, in accordance with the embodiments described herein, an end-to-end system may provide authorization to receive insights to applications defined by a name and version certified by a trusted author by means of a cryptographic signature. The trust placed on the author is to produce software that complies with a system's terms of use. The system also may need mechanisms to revoke said authorization when required.

Where available, such system may use security mechanisms of other domains to determine the veracity of the name and version of application. For example, if the domain is an Android domain, an attestation of Android application names, versions and signatures may be used. Similar attestations may be found with domains running different operating systems.

Synthetic Sensors are assumed in the present disclosure to look after their own interest and are unlikely to give away their insights to other SSs. It is also expected that most applications that are authorized to receive SS insights will not voluntarily violate a system's terms of use, and therefore not share the authorized insights, data or metadata indiscriminately.

However, SSs and applications are also not averse to gain more insights than they are authorized to. It is therefore expected that they will use all of the insights and metadata available to them.

Therefore, in accordance with the embodiments of the present disclosure, a system may limit the scope of insights and metadata to the minimal set of applications expressed by the fleet manager and limit the exposure of insights due to occasional security incidents.

Based on this, the following sections describe various ways of achieving the goal of securing sharing of insights outside the edge domain. The alternatives discussed tradeoff distribution of complexity and security responsibilities with performance and fault resilience.

Independent Application Requests for Insights

Figure 4:
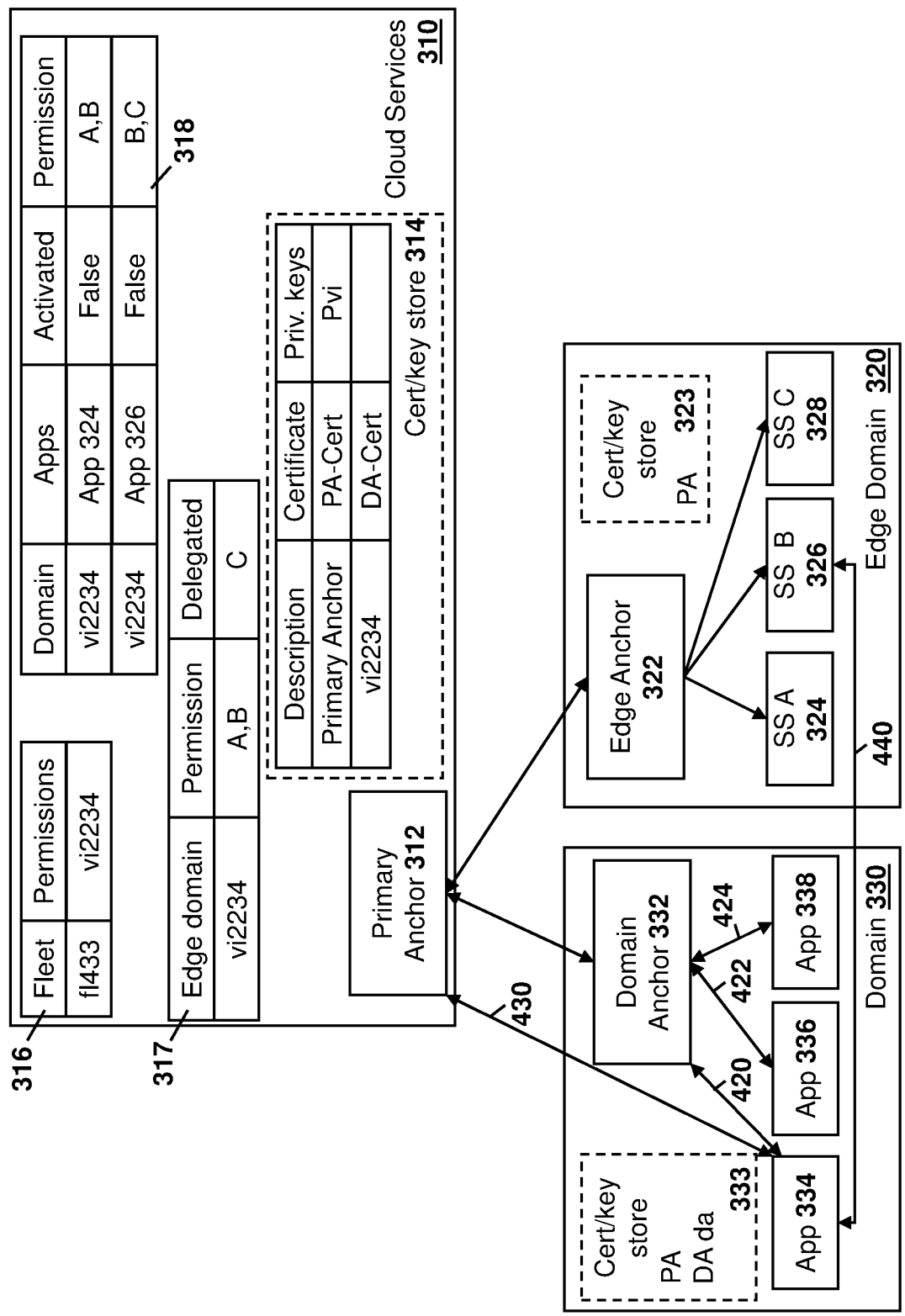
FIG. 4 is a block diagram showing an example computing system in which an application on a first domain obtains insights directly from a synthetic sensor on a second domain.

Using the provisioned certificates and permissions, one embodiment is provided herein in which an application in an external domain can securely request insights from an SS. Reference is now made to FIG. 4.

In the embodiment of FIG. 4, the example permissions and domains from FIG. 3 are used, with like numerals. However, this is merely provided for illustration and in other embodiments, different domains, SSs, applications or connections are possible.

In the example of FIG. 4, an application 334 wishes to gain an insight from SS B 326.

In this regard, an internal communications path within the domain 330 exists between application 334 and domain anchor 332. Such communication path is shown with connection 420 and can be any internal process or communication path within an operating system of the computing device of domain 330. For example, the domain anchor 332 may have an application program interface that is used to request data or provide data to the domain anchor. Other options are possible.

Similarly, application 336 may have a connection 422 with domain anchor 332 and application 338 may have a connection 424 with domain anchor 332.

In the embodiment of FIG. 4, application 334 may further be capable of communicating with primary anchor 312, shown using connection 430.

Further application 334 may be capable of communicating with synthetic sensor 326, shown using connection 440.

Connections 430 and 440 may utilize communications subsystems within domain 330 for the actual communications. For example, domain 330, and in particular application 334, may utilize a cellular communications module associated with domain 330 to send internet protocol requests to the primary anchor 312 in some cases. Similarly, domain 330 and edge domain 320 may allow communications through a wired or wireless connection such as Bluetooth, Bluetooth Low Energy, CANBus, Ethernet, among other options.

Figure 5:
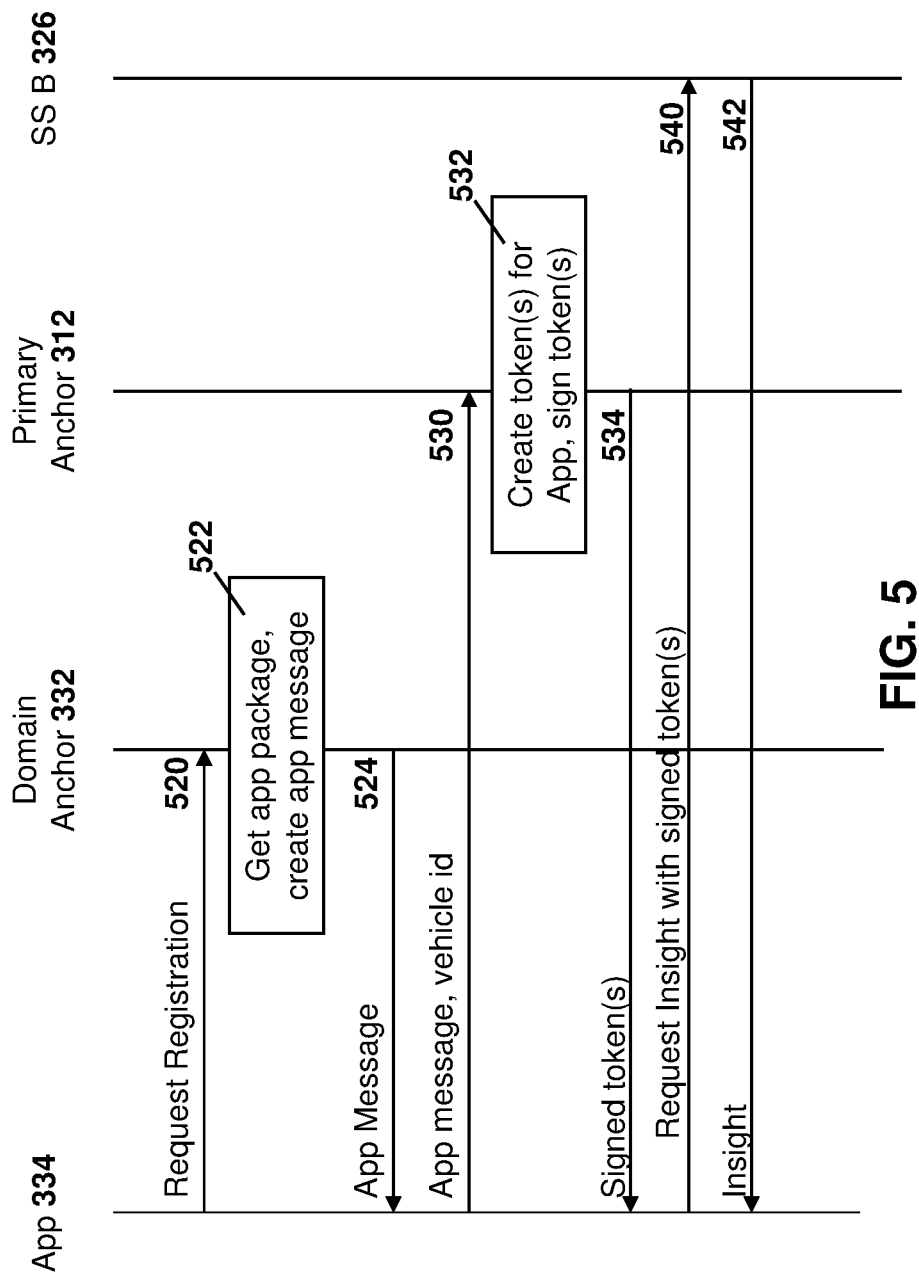
FIG. 5 is a dataflow diagram in which an application on a first domain obtains insights directly from a synthetic sensor on a second domain.

Utilizing the embodiment of FIG. 4, an application may use a token-based approach to obtain insights. Reference is made to FIG. 5.

When a new application is registered in the information technology infrastructure, it is also authorized to obtain insights utilizing the permissions based model described with regards to FIG. 3.

When that application 334 is installed on domain 330 of a vehicle, the application requests to be registered with the domain anchor 332 installed in domain 330. Such registration request is shown with message 520.

In some embodiments, application 334 may check the signature of the application package that is providing the domain anchor in the automobile instance. For example, in the Android system, the application 334 may check the signature of the Android Package Kit (APK) that is providing the domain anchor in an Android automobile instance.

At block 522 a component within the domain anchor 332 uses the operating system platform to determine the application name, version, and package signature hash of the requesting package. It may then append the vehicle identifier and sign this information, leveraging the domain anchor private key (da) to produce a locally authenticated application message.

For example, such a locally authenticated application message may be generated using a command Sign(da, {vi2234, app.a, app.a.sig, timeOfDay+validity, . . . }. In this case, the locally authenticated application message includes the private key of the domain anchor to sign a message with the vehicle identifier, an application identifier, and application signature, and may include other factors such as time of day and validity duration for the authenticated application message, among other information.

The application message is returned to application 334 in message 524.

The locally authenticated application message may then be sent to the primary anchor 312, along with the vehicle identifier, in message 530. The connection for the locally authenticated application message can in some cases be encrypted to ensure the information is not exposed to an eavesdropper.

The primary anchor 312 receives message 530 and may verify the message. Specifically, the message may be verified with the public key of the domain anchor 332 to ensure it is correctly signed.

Upon verification, the primary anchor 312, at block 532, retrieves a set of permissions available to the application on the particular vehicle and creates tokens for them, signing the token(s) with the primary anchor private key (pa), whose corresponding public key is used for verification of tokens on the edge domain 320 of the automobile.

For example, such a token may be generated using a command tkn_auth_ins_B_pa=Sign(pa, {SS.B, timeOfDay+validity}). In this case, the token includes allows for insight B to be accessed. The token includes the SS, and may include a time of day and validity duration in some embodiments. The token is signed with the private key "pa" of the primary anchor.

These tokens are returned to the requesting application in message 534. The connection for the return of the token can in some cases be encrypted to ensure the token is not exposed to an eavesdropper.

The requesting application can now request SSs to retrieve insights as shown with message 540. The request is, in the embodiment of FIG. 5, accompanied by the token scoped for the particular insight requested.

Once SS B 326 verifies the token, it may then provide the insight back to the application 334, as shown with message 542.

Therefore, in the embodiment of FIG. 5, the communication model between applications and SSs is assumed to be direct. The transport can use Transport Layer Security (TLS), since it is crossing an operating system (OS) boundary.

For example, insight sharing SSs can register a respective remote procedure call (RPC) endpoint with TLS protection. These endpoints can be communicated to application 334 along with the tokens.

When an application is interested, it can invoke the RPC endpoint to register interest for an SS's insights along with the authorization token.

When the SS has generated an insight, the SS can share it with the applications that have asked for it with valid tokens.

Alternatively, a publish/subscribe transport with TLS security can similarly be used.

The embodiments of FIGS. 4 and 5 therefore allow for a communication model that takes advantage of the microservices nature of the platform to efficiently share insights without a single point of failure. It uses the domain anchor as a trust anchor to attest to the authenticity of application 334.

Independent Application Requests for Insights Using a Gateway

In some embodiments it may not be desirable to have SSs directly act as servers or communication end points. For example, the SSs may be written by third parties that may be considered less security conscious. For these scenarios, communication may be through an Application Program Interface (API) gateway. The gateway may act as a reverse proxy for the external requesters of insights, may perform authorization checks, and may even combine results of more than one SS.

Figure 6:
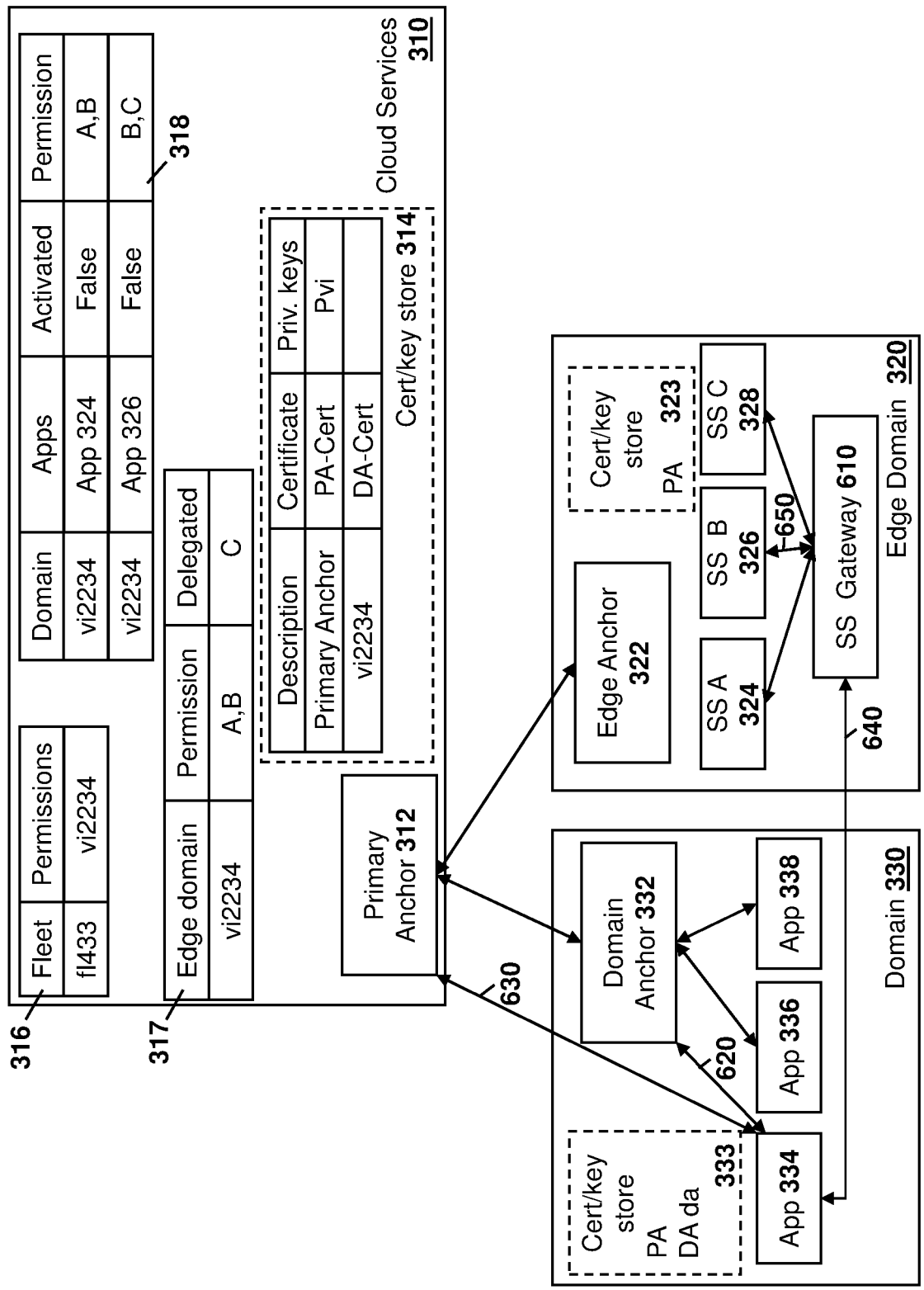
FIG. 6 is a block diagram showing an example computing system in which an application on a first domain obtains insights from a synthetic sensor on a second domain utilizing a gateway on the second domain.

The address of the gateway can be sent to application 334 when it is sent the tokens, or they can be published to be well known in domain 330. Reference is now made to FIG. 6.

In the embodiment of FIG. 6, the example permissions and domains from FIG. 3 are used, with like numerals. However, this is merely provided for illustration and in other embodiments, different domains, SSs, applications or connections are possible.

Further, in the example of FIG. 6, a gateway 610 is provided for applications to gain insights from SSs.

In the example of FIG. 6, an application 334 wishes to gain an insight from SS B 326.

In this regard, an internal communications path within the domain 330 exists between application 334 and domain anchor 332. Such communication path is shown with connection 620 and can be any internal process or communication path within an operating system of the computing device of domain 330. For example, the domain anchor 332 may have an application program interface that is used to request data or provide data to the domain anchor. Other options are possible.

In the embodiment of FIG. 6, application 334 may further be capable of communicating with primary anchor 312, shown using connection 630.

Further application 334 may be capable of communicating with gateway 510, shown using connection 640.

Gateway communicates internally within edge domain 320 with SSs, and the connection with SS B 326 is shown as connection 650.

Connections 630 and 640 may utilize communications subsystems within domain 330 for the actual communications. For example, domain 330, and in particular application 334, may utilize a cellular communications module associated with domain 330 to send internet protocol requests to the primary anchor 312 in some cases. Similarly, domain 330 and edge domain 320 may allow communications through a wired or wireless connection such as Bluetooth, Bluetooth Low Energy, CANBus, Ethernet, among other options.

Figure 7:
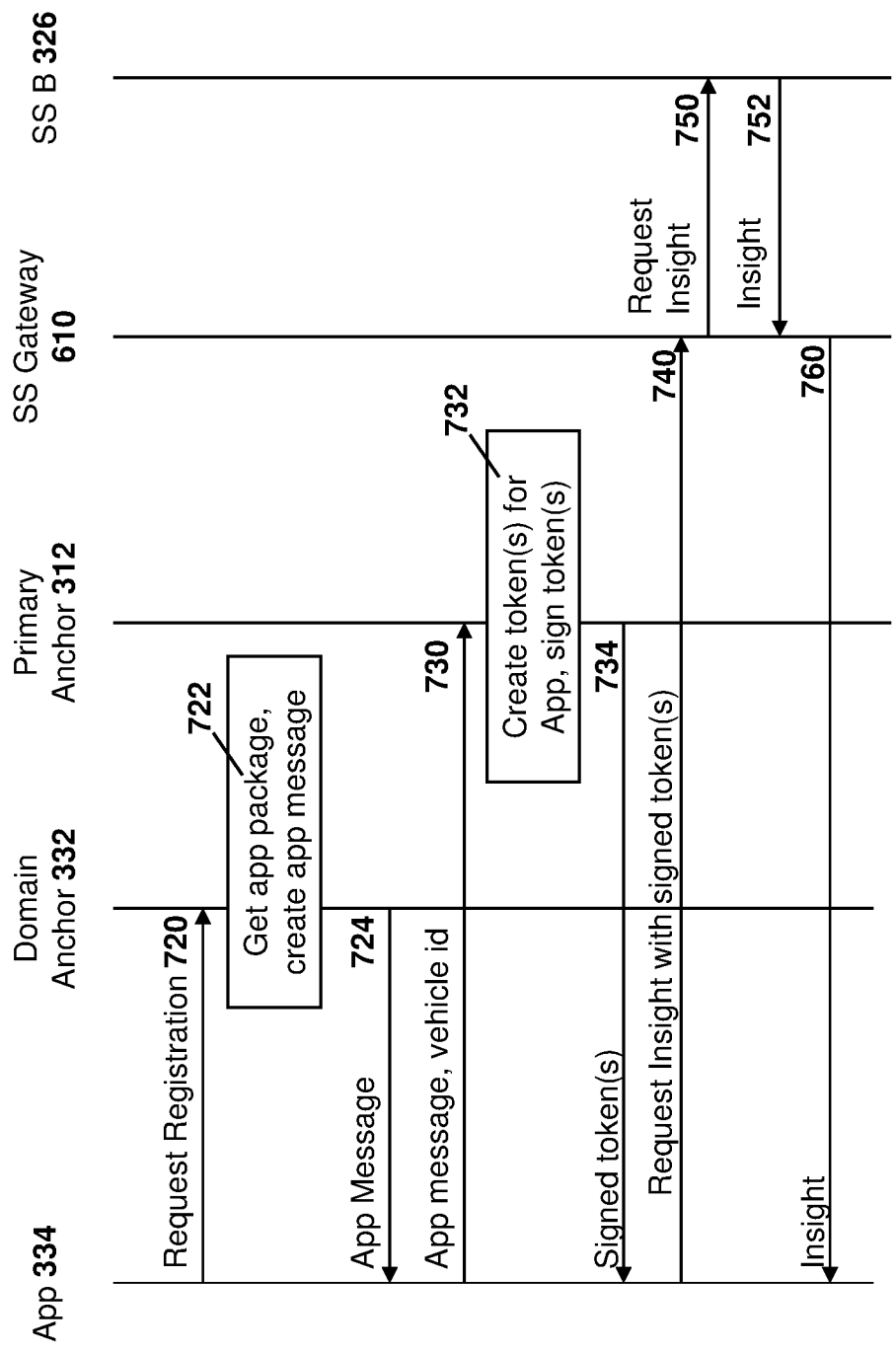
FIG. 7 is a dataflow diagram in which an application on a first domain obtains insights from a synthetic sensor on a second domain utilizing a gateway on the second domain.

Utilizing the embodiment of FIG. 6, an application may use a token-based approach to obtain insights. Reference is made to FIG. 7.

When a new application is registered in the information technology infrastructure, it is also authorized to obtain insights utilizing the permissions based model described with regards to FIG. 3.

When that application 334 is installed on domain 330 of a vehicle, the application requests for registration with the domain anchor 332 installed in domain 330. Such registration request is shown with message 720.

In some embodiments, application 334 may check the signature of the application package that is providing the domain anchor in the automobile instance. For example, in the Android system, the application 334 may check the signature of the Android Package Kit (APK) that is providing the domain anchor in an Android automobile instance.

At block 722 a component within the domain anchor 332 uses the operating system platform to determine the application name, version, and package signature hash of the requesting package. It may then append the vehicle identifier and sign this information leveraging the domain anchor private key (da) to produce a locally authenticated application message.

For example, such a locally authenticated application message may be generated using a command Sign(da, {vi2234, app.a, app.a.sig, timeOfDay+validity, . . . }. This case, the locally authenticated application message includes the private key of the domain anchor to sign a message with the vehicle identifier, an application identifier, and application signature, and may include other factors such as time of day and validity duration for the authenticated application message, among other information.

The application message is returned to application 334 in message 724.

The locally authenticated application message may then be sent to the primary anchor 312, along with the vehicle identifier, in message 730. The connection for the locally authenticated application message can in some cases be encrypted to ensure the information is not exposed to an eavesdropper.

The primary anchor 312 receives message 730 and may verify the message. Specifically, the message may be verified with the public key of the domain anchor 332 to ensure it is correctly signed.

Upon verification, the primary anchor 312, at block 732, retrieves a set of permissions available to the application on the particular vehicle and creates tokens for them, signing the token(s) with the primary anchor private key (pa), whose corresponding public key is used for verification of tokens on the edge domain 320 of the automobile.

For example, such a token may be generated using a command tkn_auth_ins_B_pa=Sign(pa, {SS.B, timeOfDay+validity}). This case, the token includes allows for insight B to be accessed. The token includes the SS, and may include a time of day and validity duration in some embodiments. The token is signed with the private key "pa" of the primary anchor.

These tokens are returned to the requesting application in message 734. The connection for the return of the token can in some cases be encrypted to ensure the token is not exposed to an eavesdropper.

The requesting application can now request to retrieve insights as shown with message 740 by utilizing gateway 610. The request is, in the embodiment of FIG. 7, accompanied by the token scoped for the particular insight requested.

Once gateway 610 verifies the token, it may then request the insight from SS B 326, shown with message 750. As the originator of message 750 is known to SS B, no verification may be needed to return the insight in message 752 to the gateway 610.

Gateway 610 may then provide the insight back to the application 334, as shown with message 760.

Therefore, in the embodiment of FIG. 7, the communication model between applications and SSs uses a gateway. The transport between the application and the gateway can use Transport Layer Security (TLS), since it is crossing an operating system (OS) boundary.

When an application is interested, it can invoke an RPC endpoint to the gateway to register interest for an SS's insights along with the authorization token.

When the SS has generated an insight, it may inform the gateway. The gateway 610 can then share it with the applications that have asked for it with valid tokens.

Alternatively, a publish/subscribe transport with TLS security can similarly be used, but using the gateway.

While the SS gateway 610 introduces a single point of failure on the automobile, one of the benefits is that requests from different and disparate domains can be accommodated by adding adapters in the gateway.

In some cases, the insights gateways can be reverse proxied further, and a higher level gateway in the cloud can be used to scale the insights across vehicles and even fleets.

Insights Via a Domain Bridge

In a further embodiment, a bridge module may be introduced in the external domain to act as a proxy for insights. Cryptographic keys from the trust anchor running in the external domain are shared into a particular domain. For example, reference is now made to FIG. 8.

Figure 8:
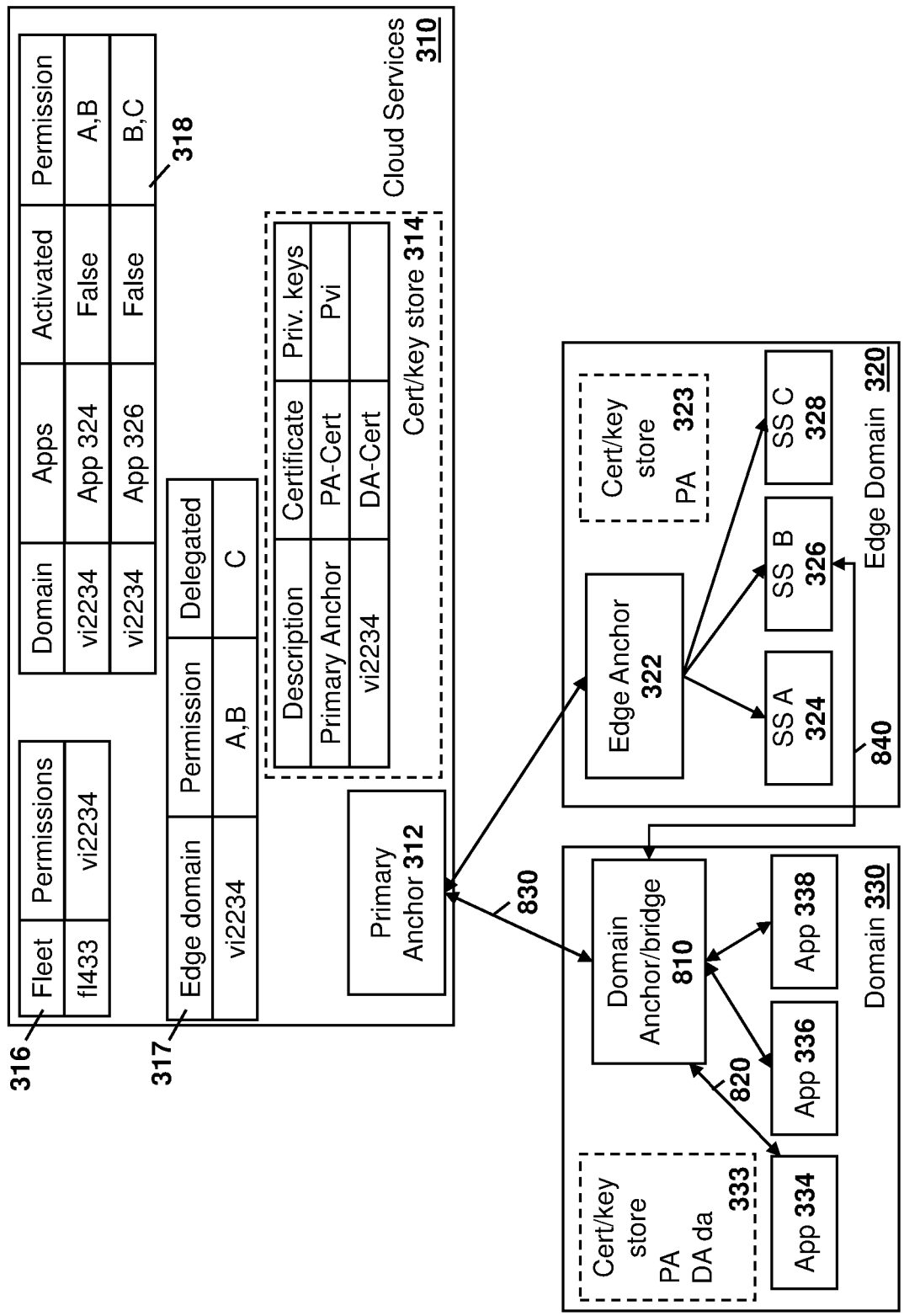
FIG. 8 is a block diagram showing an example computing system in which an application on a first domain obtains insights from a synthetic sensor on a second domain utilizing a bridge on the first domain.

In the example of FIG. 8, the domain anchor shares a public key/certificate with the edge domain via their mutual trust in the Primary Anchor. This certificate may need to be periodically renewed. Messages signed by the private key corresponding to that certificate are trusted by SSs to allow external TLS connections to the insight producing interfaces. Renewals may occur within the automobile when disconnected from the network for a configured number of times to allow for service continuity.

In the embodiment of FIG. 8, the example permissions and domains from FIG. 3 are used, with like numerals. However, this is merely provided for illustration and in other embodiments, different domains, SSs, applications or connections are possible.

In the example of FIG. 8, an application 334 wishes to gain an insight from SS B 326.

In this regard, an internal communications path within the domain 330 exists between application 334 and domain anchor/bridge 810. Such communication path is shown with connection 820 and can be any internal process or communication path within an operating system of the computing device of domain 330. For example, the domain anchor/bridge 810 may have an application program interface that is used to request data or provide data to the domain anchor. Other options are possible.

Domain anchor/bridge 810 may communicate with primary anchor 312 using a connection 830.

Further Domain anchor/bridge 810 may be capable of communicating with synthetic sensor 326, shown using connection 840.

Connections 830 and 840 may utilize communications subsystems within domain 330 for the actual communications. For example, domain 830, and in particular domain anchor/bridge 810, may utilize a cellular communications module associated with domain 330 to send internet protocol requests to the primary anchor 312 in some cases. Similarly, domain 330 and edge domain 320 may allow communications through a wired or wireless connection such as Bluetooth, Bluetooth Low Energy, CANBus, Ethernet, among other options.

Figure 9:
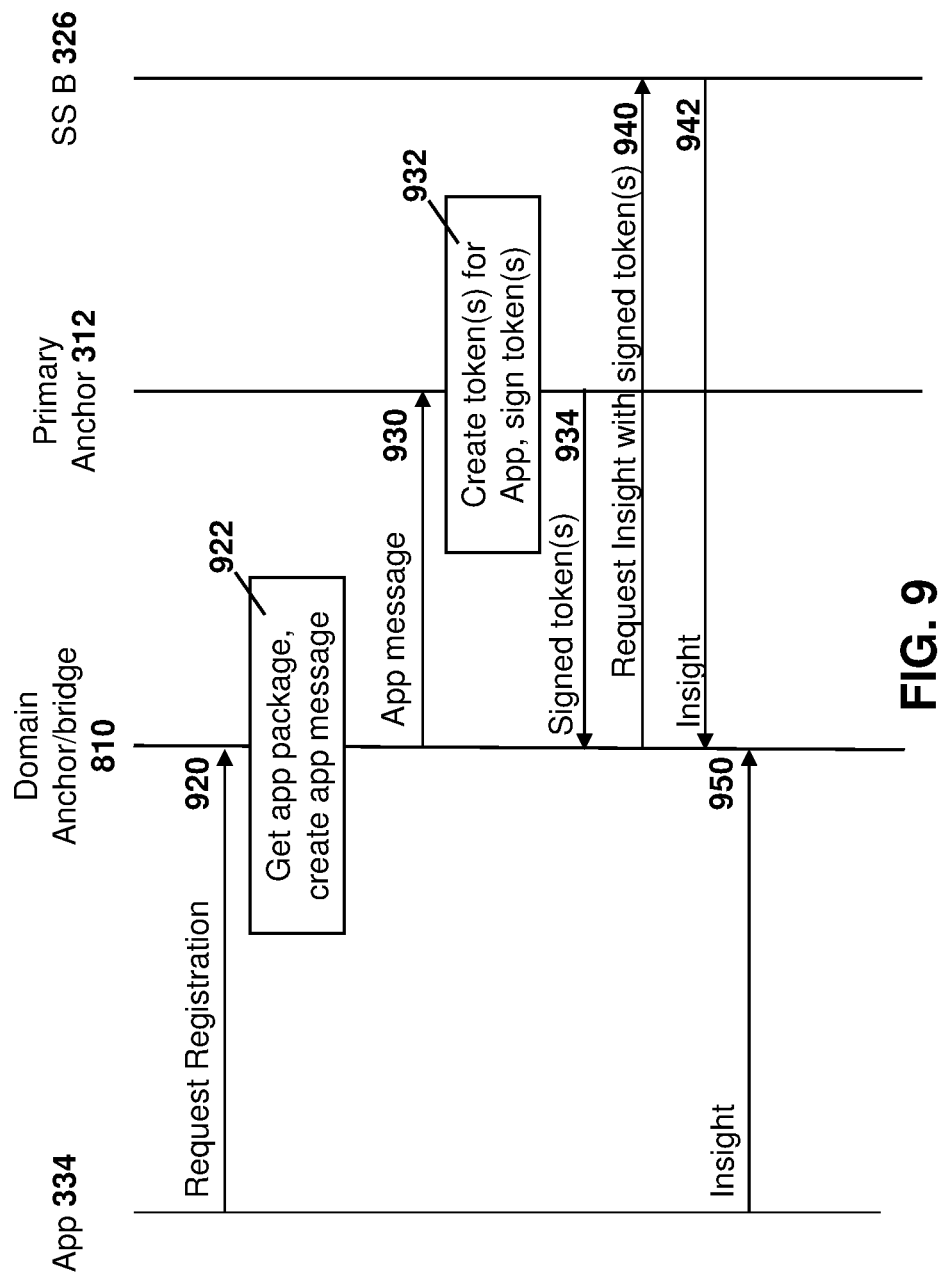
FIG. 9 is a dataflow diagram in which an application on a first domain obtains insights from a synthetic sensor on a second domain utilizing a bridge on the first domain.

Utilizing the embodiment of FIG. 8, an application may use a token-based approach to obtain insights. Reference is made to FIG. 9.

When a new application is registered in the information technology infrastructure, it is also authorized to obtain insights utilizing the permissions based model described with regards to FIG. 3.

When that application 334 is installed on domain 330 of a vehicle, the application requests for registration with the domain anchor/bridge 810 installed in domain 330. Such registration request is shown with message 920.

In some embodiments, application 334 may check the signature of the application package that is providing the domain anchor/bridge in the automobile instance. For example, in the Android system, the application 334 may check the signature of the Android Package Kit (APK) that is providing the domain anchor/bridge in an Android automobile instance.

At block 922 a component within the domain anchor 332 uses the operating system platform to determine the application name, version, and package signature hash of the requesting package. It may then sign this information leveraging the domain anchor private key (da) to produce a locally authenticated application message.

The locally authenticated application message may then be sent to the primary anchor 312, along with the vehicle identifier, in message 930. The connection for the locally authenticated application message can in some cases be encrypted to ensure the information is not exposed to an eavesdropper.

For example, such a message may be a request for a token and may be generated with a command getAuthTokensFor (Sign(da, {app.a, app.a.sig, Nonce, . . . })). In this case the signature with the private key of domain 330, the authenticated application message and a nonce to prevent replay attacks are provided.

The primary anchor 312 receives message 930 and may verify the message. Specifically, the message may be verified with the public key of the domain anchor 332 to ensure it is correctly signed.

Upon verification, the primary anchor 312, at block 932, retrieves a set of permissions available to the application on the particular vehicle and creates tokens for them, signing the token with the primary anchor private key (pa), whose corresponding public key is used for verification of tokens on the edge domain 320 of the automobile.

These tokens are returned to the requesting application in message 934. The connection for the return of the token can in some cases be encrypted to ensure the token is not exposed to an eavesdropper.

The domain anchor/bridge 810 can now request SSs to retrieve insights as shown with message 940. The request is, in the embodiment of FIG. 9, accompanied by the token scoped for the particular insight requested.

Once SS B 326 verifies the token, it may then provide the insight back to the domain anchor/bridge 810, as shown with message 942.

Therefore, in the embodiment of FIG. 9, the communication model between applications and SSs flows through a bridge. The transport can use Transport Layer Security (TLS), since it is crossing an operating system (OS) boundary.

For example, insight sharing SSs can register a respective remote procedure call (RPC) endpoint with TLS protection. These endpoints can be communicated to bridge along with the tokens.

The bridge can then invoke the RPC endpoint to register interest for an SS's insights along with the authorization token.

When the SS has generated an insight, the SS can share it with the bridge(s) that have asked for it with valid tokens.

Alternatively, a publish/subscribe transport with TLS security can similarly be used.

Using the domain bridge approach allows the applications to remain simple, since there is no need to implement any of the details of the security mechanisms. Specifically, the applications may just make calls to another application, namely the domain bridge/anchor as if the insights were local. That module acts as a data bridge for domain 330. There is also no risk of an application leaking tokens, since they are never shared. Tokens can still be used to check for authorization at the source of insights.

Insights Via Domain Bridge and Gateway

A further embodiment uses both a domain bridge as well as gateway. The domain bridge may be used to simplify the internal interaction with the applications. The gateway may be used to simplify the external interaction with the SS.

In some cases, in this embodiment the need for tokens can be removed since it is possible to rely on a local trust anchor to determine the identity of the requestor. However, in other cases the tokens may be maintained in this embodiment.

The domain anchor's role in this embodiment is to verify identity, whereas the gateway's role is to check authorization. The domain anchor and gateway may therefore synchronize the latest set of permissions when connected to the primary anchor.

Figure 10:
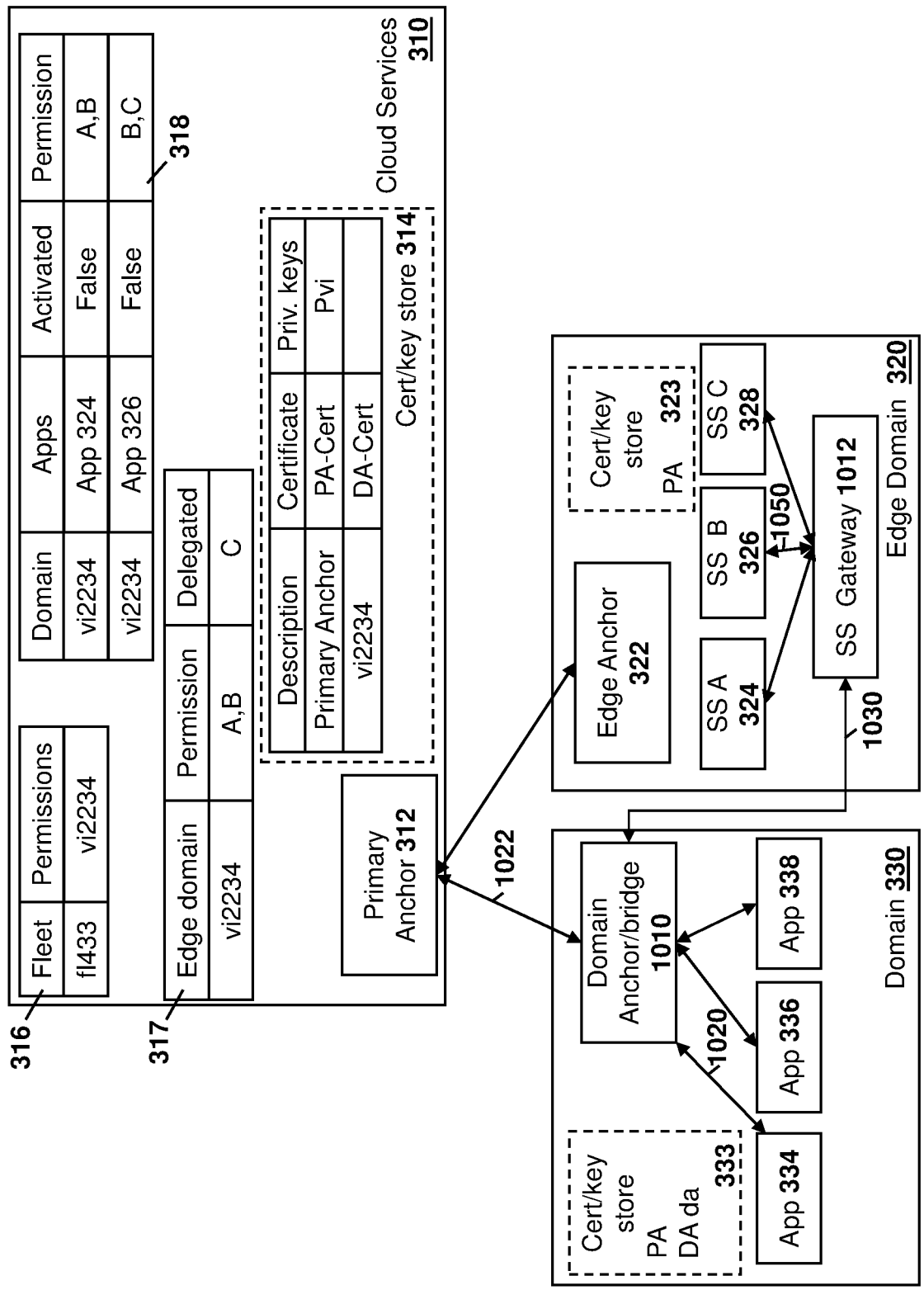
FIG. 10 is a block diagram showing an example computing system in which an application on a first domain obtains insights from a synthetic sensor on a second domain utilizing a bridge on the first domain and a gateway on the second domain.

Reference is made to FIG. 10. In the embodiment of FIG. 10, the example permissions and domains from FIG. 3 are used, with like numerals. However, this is merely provided for illustration and in other embodiments, different domains, SSs, applications or connections are possible.

Further, in the example of FIG. 10, a domain anchor/bridge 1010 and a gateway 1012 are provided for applications to gain insights from SSs.

In the example of FIG. 10, an application 334 wishes to gain an insight from SS B 326.

In this regard, an internal communications path within the domain 330 exists between application 334 and domain anchor 332. Such communication path is shown with connection 1020 and can be any internal process or communication path within an operating system of the computing device of domain 330. For example, the domain anchor/ bridge 1010 may have an application program interface that is used to request data or provide data to the domain anchor. Other options are possible.

Domain anchor/bridge 1010 may be capable of communicating with primary anchor 312, shown using connection 1022.

Further the domain anchor/bridge 1010 may be capable of communicating with gateway 1012, shown using connection 1030.

Gateway communicates internally within edge domain 320 with SSs, and the connection with SS B 326 is shown as connection 1050.

Connections 1022 and 1030 may utilize communications subsystems within domain 330 for the actual communications. For example, domain 330, and in particular domain anchor/bridge 1010, may utilize a cellular communications module associated with domain 330 to send internet protocol requests to the primary anchor 312 in some cases. Similarly, domain 330 and edge domain 320 may allow communications through a wired or wireless connection such as Bluetooth, Bluetooth Low Energy, CANBus, Ethernet, among other options.

Figure 11:
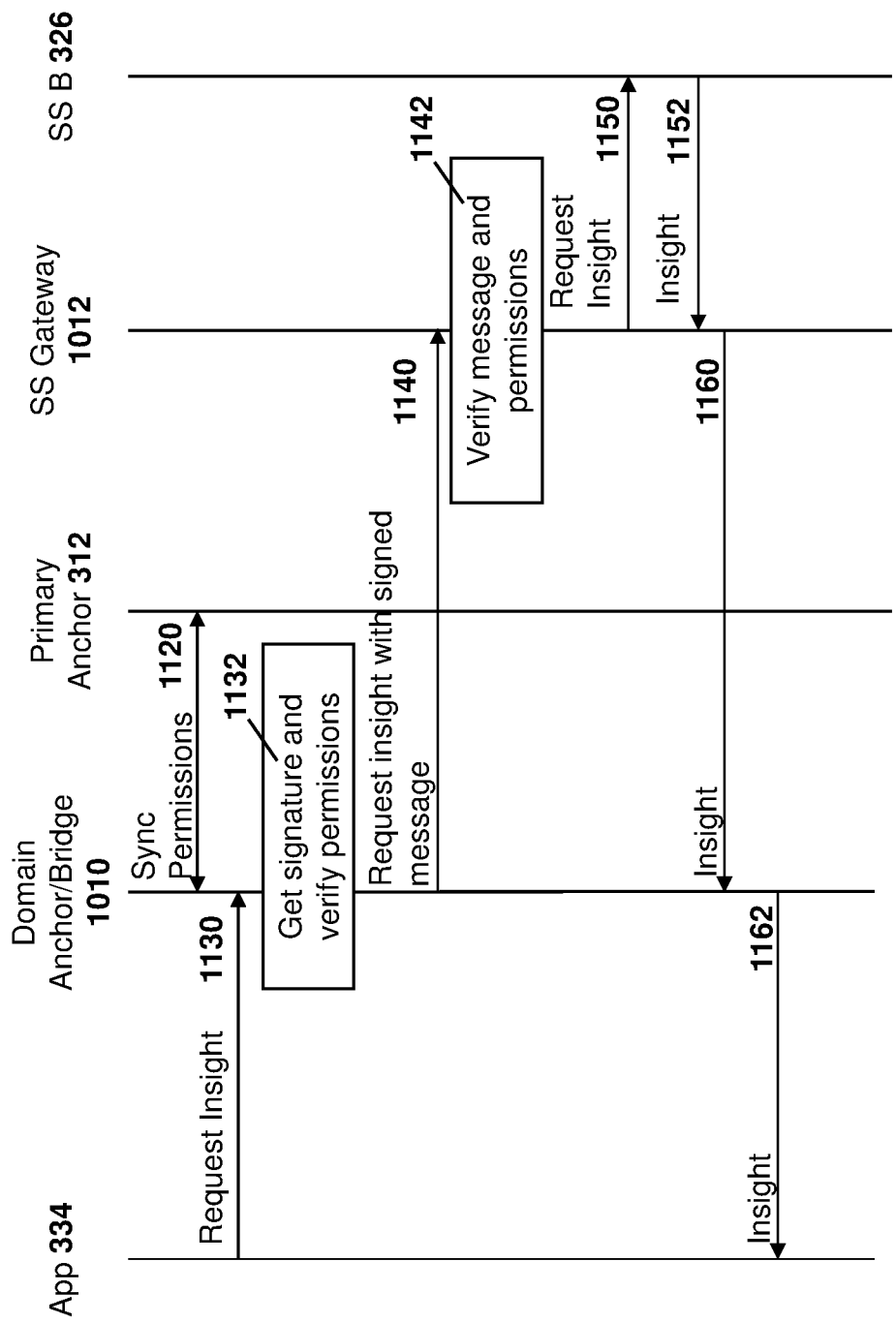
FIG. 11 is a dataflow diagram in which an application on a first domain obtains insights from a synthetic sensor on a second domain utilizing a bridge on a first domain and a gateway on the second domain.

Utilizing the embodiment of FIG. 10, an application may use a verification approach to obtain insights. Reference is made to FIG. 11.

In the embodiment of FIG. 11 the domain anchor/bridge 1010 communicates with primary anchor 312 and will periodically or opportunistically synchronize permissions, as shown with arrow 1120. Specifically, while the embodiment of FIG. 11 only shows a single synchronization for permissions, in practice, the domain anchor/bridge 1010 may synchronize permissions with the primary anchor 312 based on various options. For example, synchronization may occur when an Internet connection is established, such as connection 1022. In other cases, if the vehicle has been out of cellular coverage for a period of time then when cellular coverage is regained then the permissions may be synchronized. In other cases, the permissions may be synchronized after a timer has expired. In other cases, the permissions may be synchronized at the first opportunity after a specific date and time has passed. Other options are possible.

In this way, a local instance of table 318 is stored at the vehicle. This provides for access to insights while the vehicle is out of coverage of cloud services 310 and further expedites the process by removing the delay in obtaining the permissions from the cloud services 310.

Similar synchronization may occur at the edge anchor (not shown) to have a local copy of the permissions at the edge anchor as well. In other cases, the synchronization may occur only with the edge anchor and the primary anchor, and then the edge anchor may provide access to the local table to the domain anchor/bridge. Other options are possible.

When that application 334 is installed on domain 330 of a vehicle, the application requests for registration with the domain anchor/bridge 1010 installed in domain 330. Such registration request is shown with message 1130. In this case, message 1130 may be the application requesting an insight for the first time.

In some embodiments, application 334 may check the signature of the application package that is providing the domain anchor/bridge in the automobile instance. For example, in the Android system, the application 334 may check the signature of the Android Package Kit (APK) that is providing the domain anchor/bridge in an Android automobile instance.

At block 1132 a component within the domain anchor/bridge 1010 extracts the application signature from message 1130. It may then check the permissions within the local instance of table 318 to determine whether application 334 has permissions to access the insights from the synthetic sensor that the request is made for. In this way, the domain anchor/bridge may verify the identity of the application 334 and that the application 334 is a valid client application authorized to request insights on the vehicle.

Based on the verification at block 1132, the domain anchor/bridge may then send a request for the inside to the gateway 1012, as shown with message 1140. For example, the request in message 1140 may be reqInsightFor(sign(da, {app.a, params})). In this message, the identity of the application and parameters are signed with the private key of the domain 330. As the gateway and the domain anchor/bridge are mutually authenticated, no tokens are required for such communication. In particular, at block 1142, permission state checks are made at the gateway 1012 and, based on the check, insights may be returned.

Specifically, the gateway 1012 may request an insight from the SS B 326 as shown with message 1150 and receive insight back as message 1152. As the gateway is known to SS B, no check may be needed for message 1150.

The gateway 1012 may then return the insight in message 1160 to the domain anchor/bridge 1010.

The domain anchor/bridge 1010 may then provide the insight to application 334 with message 1162.

Therefore, in the embodiment of FIG. 11, the communication model between applications and SSs uses both a gateway and bridge. The transport between the bridge and the gateway can use Transport Layer Security (TLS), since it is crossing an operating system (OS) boundary.

Cloud Applications for Accessing Insights

While in vehicle applications request insights from synthetic sensors as in the above embodiments, it is also possible for web based or other network-based applications to request similar data.

Figure 12:
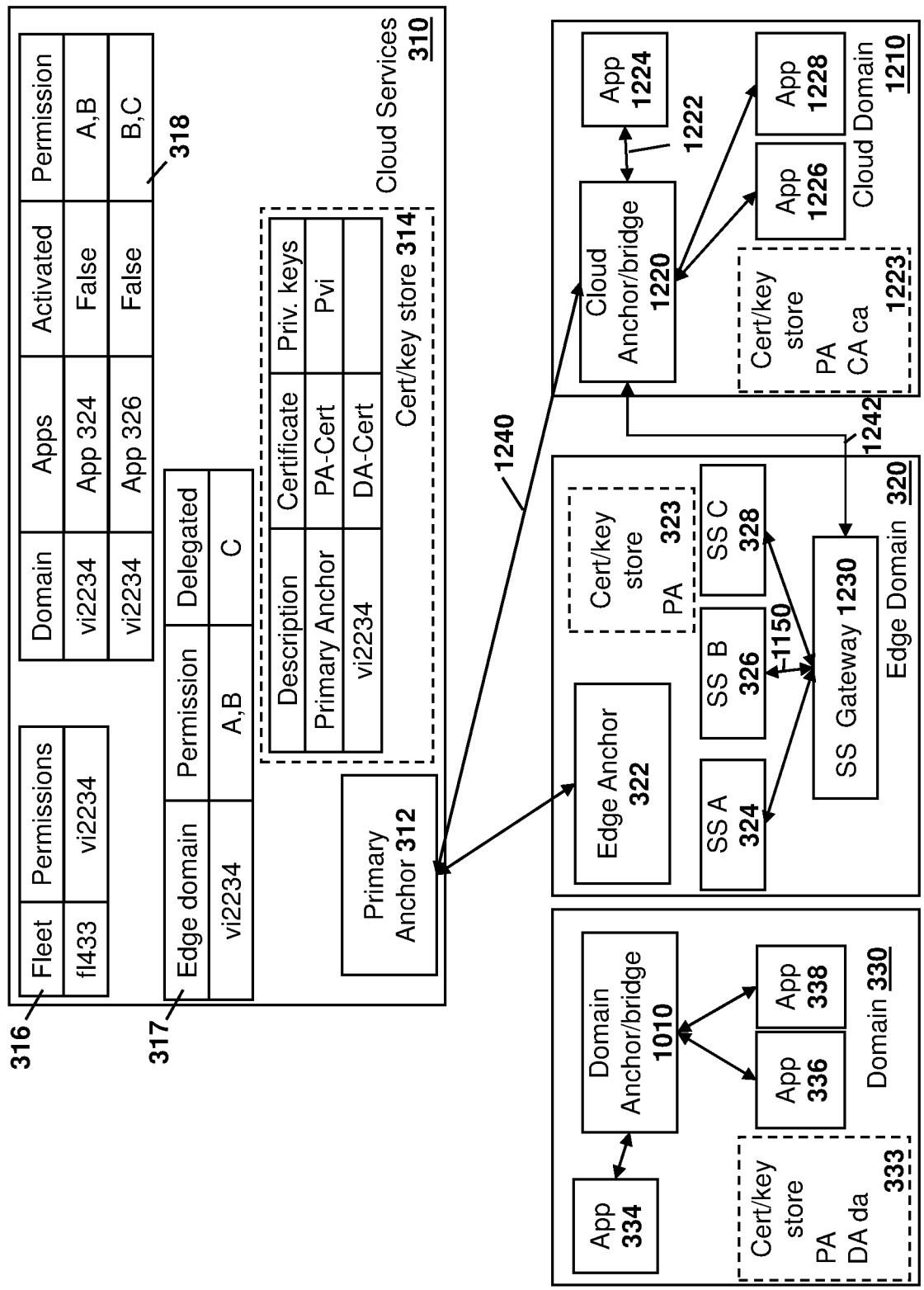
FIG. 12 is a block diagram showing an example computing system in which an application on a first, network based, domain obtains insights from a synthetic sensor on a second domain utilizing a bridge on the first domain and a gateway on the second domain.

Reference is now made to FIG. 12, which uses both a domain bridge and gateway for web or network based applications. The cloud bridge may be used to simplify the internal interaction with the applications. The gateway may be used to simplify the external interaction with the SS.

In some cases, in this embodiment the need for tokens can be removed since it is possible to rely on a local trust anchor to determine the identity of the requestor. However, in other cases the tokens may be maintained in this embodiment.

The cloud anchor's role in this embodiment is to verify identity, whereas the gateway's role is to check authorization. The cloud anchor and gateway may therefore synchronize the latest set of permissions when connected to the primary anchor.

Reference is made to FIG. 12. In the embodiment of FIG. 12, the example permissions and domains from FIG. 3 and FIG. 10 are used, with like numerals. However, this is merely provided for illustration and in other embodiments, different domains, SSs, applications or connections are possible.

In the embodiment of FIG. 12, a cloud domain 1210 is provided. The cloud domain 1210 includes a cloud anchor/bridge 1220 along with a certificate or key store 1223. The certificate or key store 1223 may be provisioned with the public key of the primary anchor 312. Further, the certificate or key store may be used to create or store a public key/private key pair for the cloud anchor, referred to in the embodiment of FIG. 12 as "CA" for the public key and "ca" for the private key.

In the embodiment of FIG. 12, three applications are shown as cloud applications, namely application 1224, application 1226 and application 1228. However, the use of three applications is not limiting is provided only for illustration. Fewer or more applications than three could exist in practice.

Further, in the example of FIG. 12, a gateway 1212 is provided within an edge domain for applications to gain insights from SSs.

In the example of FIG. 12, an application 1224 wishes to gain an insight from SS B 326.

In this regard, an internal communications path within the cloud domain 1210 exists between application 334 and domain anchor 332. Such communication path is shown with connection 1222 and can be any internal process or communication path within an operating system of the computing device of cloud domain 1210. For example, the cloud domain anchor/bridge 1220 may have an application program interface that is used to request data or provide data to the cloud domain anchor/bridge. Other options are possible.

Cloud domain anchor/bridge 1220 may be capable of communicating with primary anchor 312, shown using connection 1240.

Further the cloud domain anchor/bridge 1220 may be capable of communicating with gateway 1230, shown using connection 1242.

Gateway 1230 communicates internally within edge domain 320 with SSs, and the connection with SS B 326 is shown as connection 1250.

Connection 1240 and 1242 may utilize communications subsystems within cloud domain 1200 for the actual communications. For example, cloud domain 1210, and in particular cloud domain anchor/bridge 1220, may utilize a cellular communications module associated with cloud domain 1210 to send internet protocol requests to the gateway 1230 on edge domain 320 in some cases. Similarly, cloud domain 1210 and may allow communications through a wired or wireless connection such as fiber, ethernet, cellular, satellite, among other options with cloud services 310.

Figure 13:
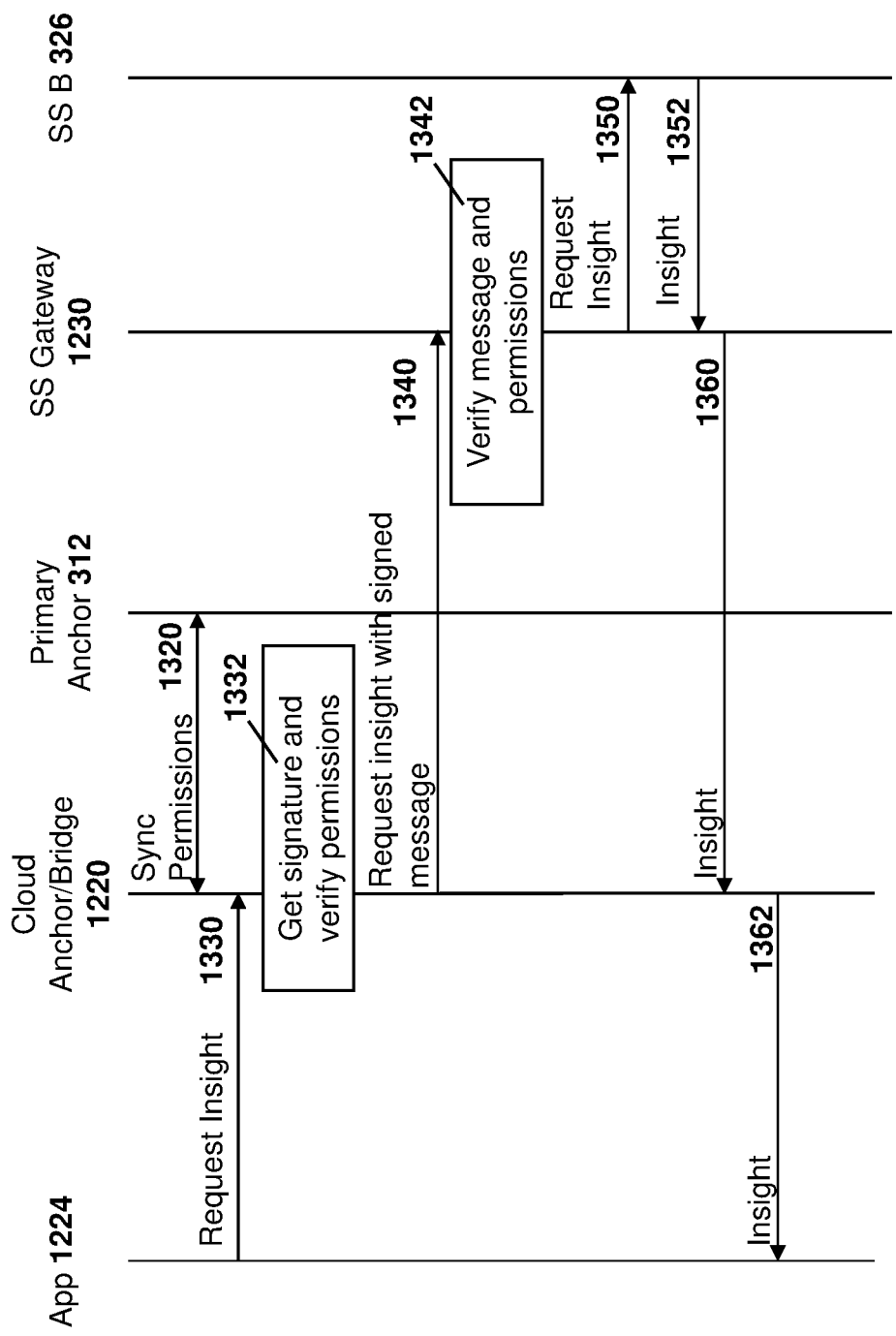
FIG. 13 is a dataflow diagram in which an application on a first, network based, domain obtains insights from a synthetic sensor on a second domain utilizing a bridge on a first domain and a gateway on the second domain.

Utilizing the embodiment of FIG. 12, an application may use a verification approach to obtain insights. Reference is made to FIG. 13.

In the embodiment of FIG. 13 the cloud domain anchor/bridge 1210 communicates with primary anchor 312 and may periodically update permissions, as shown with arrow 1320. Specifically, while the embodiment of FIG. 11 only shows a single synchronization for permissions, in practice, the cloud domain anchor/bridge 1210 may synchronize based on expiration times or periodically.

In other cases, since cloud domain 1210 is a network element that is always connected, a local table may not be needed.

Further, the edge anchor 322 may periodically update a local table with the primary anchor 312 in some embodiments (not shown). For example, synchronization may occur when an Internet connection is established with the vehicle. In other cases, if the vehicle has been out of cellular coverage for a period of time, then when cellular coverage is regained, the permissions may be synchronized. In other cases, the permissions may be synchronized after a timer has expired. In other cases, the permissions may be synchronized at the first opportunity after a specific date and time has passed. Other options are possible.

In this way, a local instance of table 318 may be stored at the cloud domain 1210 and may in some cases also be stored at the vehicle.

When that application 1324 is installed on cloud domain 1210, the application requests for registration with the cloud anchor/bridge 1220 installed in cloud domain 1210. Such registration request is shown with message 1330. In this case, message 1330 may involve the application requesting an insight for the first time.

In some embodiments, application 1324 may check the signature of the application package that is providing the cloud domain anchor in the cloud instance.

At block 1332 a component within the cloud domain anchor/bridge 1220 extracts the application signature from message 1330. It may then check the permissions within the local instance of table 318 (or it may check with the primary anchor in some embodiments) to determine whether application 1324 has permissions to access the insights from the synthetic sensor that the request is made for. In this way, the domain anchor/bridge may verify the identity of the application 1324 and that the application 1324 is a valid client application authorized to request insights on the vehicle.

Based on the verification at block 1332, the cloud domain anchor/bridge may then send a request for the inside to the gateway 1230, as shown with message 1340. For example, the request in message 1340 may be reqInsightFor(sign(ca, {webapp.a, params})). In this message, the identity of the application and parameters are signed with the private key of the cloud domain 1210. As the gateway and the domain anchor/bridge are mutually authenticated, no tokens are required for such communication. In particular, at block 1342, permission state checks are made at the gateway 1230 and based on the check insights may be returned.

Specifically, the gateway 1230 may request an insight from the SS B 326 as shown with message 1350 and receive insight back as message 1352. As gateway 1350 is known to SS B 326, no checking of message 1350 may be needed.

The gateway 1230 may then return the insight in message 1360 to the domain anchor/bridge 1220.

The domain anchor/bridge 1220 may then provide the insight to application 1224 with message 1362.

Therefore, in the embodiment of FIG. 13, the communication model between applications and SSs uses both a gateway and bridge, where the bridge exists on a network or cloud element. The transport between the bridge and the gateway can use Transport Layer Security (TLS), since it is crossing an operating system (OS) boundary.

From the embodiments of FIGS. 12 and 13, the authentication steps include introducing a cloud anchor certificate during initial provisioning. The anchors can then synchronize with the primary anchor to obtain permissions. No tokens are needed in this case.

The cloud anchor may then verify the application identity by ensuring that the calling web/network application is a valid client application authorized to request insights on the vehicle.

The gateway and cloud Bridge mutually authenticate. Permission state checks are made at the gateway and responses provided appropriately.

Disconnected Mode

In all of the above embodiments the vehicle may be disconnected from the cloud servers. For this reason, when the vehicle is disconnected from the cloud configurable policies may exist for ensuring the validity of entries in the shared table or for ensuring the validity of tokens.

In some cases, an OEM or delegate may assign a configuration as follows:
 a. Valid until next reconnection;
 b. Valid until absolute time when unable to reconnect (this will typically need to be reset upon connection);

c. Valid until specified time since last connection when unable to reconnect; or d. Valid for specified number of refreshes when unable to reconnect.

Other options for the duration of validity for a configuration are also possible.

In the above, a connection implies ability to securely retrieve changes, if any, from the cloud service. When the entry in the shared table, or token is not valid based on the above configuration, access requisitions based on the same may be denied.

The above domains, network elements, cloud services, nodes, and other computing platforms may be implemented using any computing device. One simplified diagram of a computing device is shown with regard to FIG. 14. The computing device of FIG. 14 could be any fixed or mobile computing device.

Figure 14:
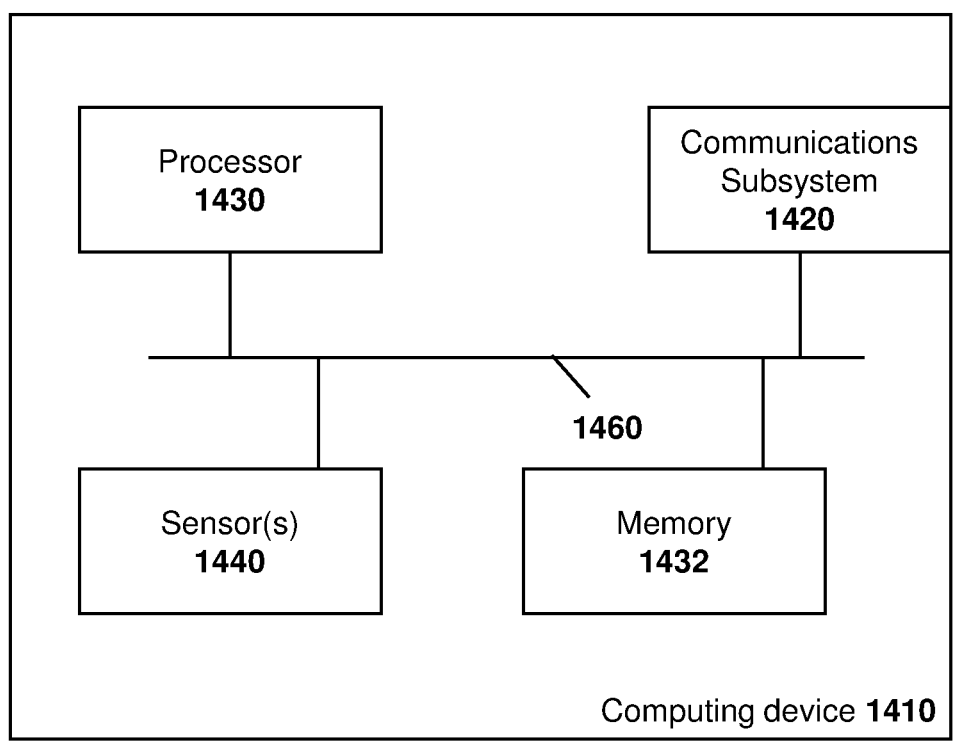
FIG. 14 is a block diagram of a simplified computing device capable of being used with the embodiments of the present disclosure.

In FIG. 14, device 1410 includes a processor 1420 and a communications subsystem 1430, where the processor 1420 and communications subsystem 1430 cooperate to perform the methods of the embodiments described above. Communications subsystem 1430 allows device 1410 to communicate with other devices or network elements and may vary based on the type of communication being performed. Further, communications subsystem 1430 may comprise a plurality of communications technologies, including any wired or wireless communications technology.

Processor 1420 is configured to execute programmable logic, which may be stored, along with data, on device 1410, and shown in the example of FIG. 14 as memory 1432. Memory 1432 can be any tangible, non-transitory computer readable storage medium which stores instruction code that, when executed by processor 1420 cause device 1410 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1432, device 1410 may access data or programmable logic from an external storage medium, for example through communications subsystem 1430.

In the example of FIG. 14, one or more sensors 1440 may be associated with the computing device. However, this is optional and in some cases computing device 1410 will not be associated with sensors.

Communications between the various elements of device 1410 may be through an internal bus 1460 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a network element for securely sharing services across domains, the method comprising:
   receiving a request at the network element to add a first domain and an edge domain to a system;
   populating, in the network element, a table with services, the services being provided by the first domain or the edge domain;
   populating, in the network element, a second table with applications installed at the first domain or edge domain and permissions corresponding to a subset of the services; and
   controlling access to the services by the applications based on the permissions.

2. The method of claim 1, wherein the controlling access comprises:
   receiving a request from an application on the first domain, the request being signed by the first domain;
   verifying the request; and
   based on the verifying and based on the permissions for the application, providing at least one token for a service back to the first domain, the at least one token including an identifier for the service and a signature of the network element.

3. The method of claim 2, wherein the token further includes an expiration time.

4. The method of claim 1, wherein the controlling access comprises:
   receiving a request from a domain bridge on the first domain, the request being signed by the first domain and including an application identifier;
   verifying the request; and
   based on the verifying and based on the permissions for an application associated with the application identifier, providing at least one token for a service back to the domain bridge, the at least one token including an identifier for the service and a signature of the network element.

5. The method of claim 1, wherein the controlling access comprises:
   receiving a request from the first domain to synchronize the second table; and
   providing the second table to the first domain.

6. The method of claim 1, wherein the table with services further includes delegation of permissions for at least one of the services.

7. The method of claim 1, wherein the first domain and the edge domain belong to a vehicle, and wherein the network element is a fleet manager.

8. A network element for securely sharing services across domains, the network element comprising:
   a processor; and
   a communications subsystem,
   wherein the network element is configured to:
   receive a request at the network element to add a first domain and an edge domain to a system;
   populate, in the network element, a table with services, the services being provided by the first domain or the edge domain;
   populate, in the network element, a second table with applications installed at the first domain or edge domain and permissions corresponding to a subset of the services; and
   control access to the services by the applications based on the permissions.

9. The network element of claim 8, wherein the network element is configured to control access by:
   receiving a request from an application on the first domain, the request being signed by the first domain;
   verifying the request; and
   based on the verifying and based on the permissions for the application, providing at least one token for a service back to the first domain, the at least one token including an identifier for the service and a signature of the network element.

10. The network element of claim 9, wherein the token further includes an expiration time.

11. The network element of claim 8, wherein the network element is configured to control access by:
   receiving a request from a domain bridge on the first domain, the request being signed by the first domain and including an application identifier;
   verifying the request; and
   based on the verifying and based on the permissions for an application associated with the application identifier, providing at least one token for a service back to the domain bridge, the at least one token including an identifier for the service and a signature of the network element.

12. The network element of claim 8, wherein the network element is configured to control access by:
   receiving a request from the first domain to synchronize the second table; and
   providing the second table to the first domain.

13. The network element of claim 8, wherein the table with services further includes delegation of permissions for at least one of the services.

14. The network element of claim 8, wherein the network element is configured to provision during manufacture of a computing device with the first domain and the edge domain.

15. The network element of claim 8, wherein the network element is configured to provision when a computing device with the first domain and the edge domain is at a trusted service center.

16. The network element of claim 8, wherein the first domain and the edge domain belong to a vehicle, and wherein the network element is a fleet manager.

17. A non-transitory computer readable medium for storing instruction code, which, when executed by a processor of a network element configured for securely sharing services across domains cause the network element to:
   receive a request at the network element to add a first domain and an edge domain to a system;
   provision a public key of the network element to the first domain and the edge domain;
   receive a public key of the first domain;
   populate, in the network element, a table with services, the services being provided by the first domain or the edge domain;

populate, in the network element, a second table with applications installed at the first domain or edge domain and permissions corresponding to a subset of the services; and control access to the services by the applications based on the permissions.

18. The computer readable medium of claim 17, wherein the instruction code further causes the network element to control access by:

receiving a request from an application on the first domain, the request being signed by the first domain;

verifying the request; and based on the verifying and based on the permissions for services for the application, providing at least one token for a service back to the first domain, the at least one token including an identifier for the service and a signature of the network element.

\* \* \* \* \*